United States Patent [19]

Blette et al.

[11] Patent Number: 5,035,350

[45] Date of Patent: Jul. 30, 1991

[54] METHOD AND APPARATUS FOR PRECISION SQUEEZE TUBE VALVING, PUMPING AND DISPENSING OF WORK FLUID(S)

[75] Inventors: Russell E. Blette, West Chicago; John O. Roeser, Barrington, both of Ill.

[73] Assignee: Minnesota Mining and Manufacturing Company, St. Paul, Minn.

[21] Appl. No.: 570,896

[22] Filed: Aug. 22, 1990

Related U.S. Application Data

[62] Division of Ser. No. 07/313,389, Feb. 21, 1989, Pat. No. 4,967,940.

[51] Int. Cl.$^5$ .............................. B65D 37/00
[52] U.S. Cl. .................................. 222/212; 222/214
[58] Field of Search ............... 222/212, 214, 476, 504, 222/559, 109; 251/7; 137/614.4

[56] References Cited

U.S. PATENT DOCUMENTS

| | | | |
|---|---|---|---|
| 2,412,397 | 12/1946 | Harper | 417/474 |
| 2,842,331 | 7/1958 | Anderson | 251/6 |
| 2,895,653 | 7/1959 | Giepen | 222/504 |
| 2,989,076 | 6/1961 | Rohmann | 137/620 |
| 3,508,683 | 4/1970 | van der Schee | 264/16 |
| 3,609,069 | 9/1971 | Martinelli | 417/474 |
| 3,685,538 | 8/1972 | Sullivan | 137/504 |
| 3,759,483 | 9/1973 | Baxter | 251/5 |
| 3,830,462 | 8/1974 | Henfrey | 251/5 |
| 3,840,207 | 10/1974 | Carpenter | 251/5 |
| 3,904,078 | 9/1975 | Neff et al. | 222/1 |
| 3,913,636 | 10/1975 | Mochida | 417/474 |
| 3,932,065 | 1/1976 | Ginsberg et al. | 417/317 |
| 3,980,043 | 9/1976 | Pomper | 118/610 X |
| 3,998,103 | 12/1976 | Bjorklund et al. | 222/212 |
| 4,026,439 | 5/1977 | Coeks | 222/49 |
| 4,030,640 | 6/1977 | Cirin et al. | 222/214 |
| 4,095,722 | 6/1978 | Miller | 222/214 |
| 4,099,700 | 7/1978 | Young | 251/7 |
| 4,155,362 | 5/1979 | Jess | 417/477 |
| 4,264,020 | 4/1981 | Loiseau | 222/214 |
| 4,356,940 | 11/1982 | Ansorge | 222/596 |
| 4,410,108 | 10/1983 | Minard | 222/380 |
| 4,442,954 | 4/1984 | Bergandy | 222/212 |
| 4,450,981 | 2/1984 | Haig | 222/61 |
| 4,559,038 | 12/1985 | Berg et al. | 417/474 |
| 4,584,964 | 4/1986 | Engel | 118/704 X |
| 4,601,411 | 7/1986 | Van Overbruggen | 222/504 |

FOREIGN PATENT DOCUMENTS

| | | | |
|---|---|---|---|
| 941672 | 7/1982 | U.S.S.R. | 417/474 |
| 1465712 | 3/1989 | U.S.S.R. | 222/214 |
| 2150644 | 7/1985 | United Kingdom | 417/474 |

OTHER PUBLICATIONS

Dispensit, Inc., Various Devices, Published Prior to Feb. 20, 1988.

Primary Examiner—Michael S. Huppert
Assistant Examiner—Kenneth Bomberg
Attorney, Agent, or Firm—Robert D. Silver

[57] ABSTRACT

Presented is a method and apparatus for precision control of work fluids in a squeezable tube that has no surge of work material during the shut off closing of the tube which is accomplished by a compensator moving simultaneously and oppositely to the shut off member movement, each of the compensator and the shut off member having different stroke lengths and tube engagable surface areas which effectively keep the internal volume of the tube the same. The method and apparatus are useful standing alone, in coordination with precision positive displacement pumping under computer control which is also presented, and as a part of sequential or simultaneous movement of a valve/pump dispensing head coordinated with a stationary or movable work piece to provide exceedingly fine control dispensing. Suckback between dispensing shots is coordinated with shut off and movements of inlet, outlet and dispensing members to afford operator programmable dispensing with precision and without drip.

3 Claims, 9 Drawing Sheets

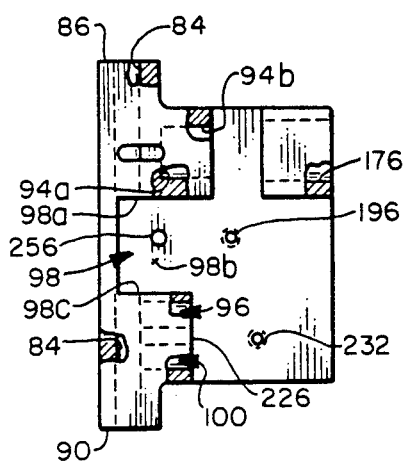
FIG.5
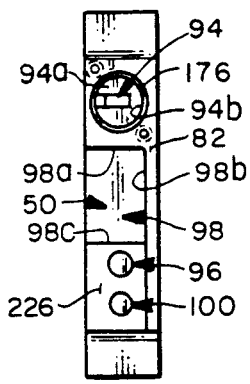
FIG.6
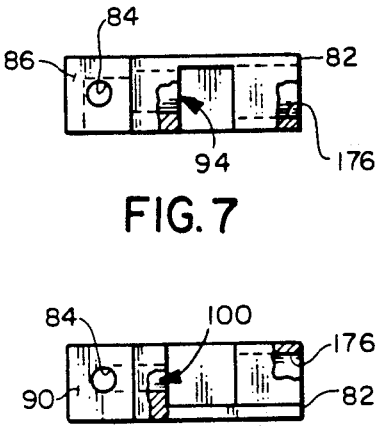
FIG.7
FIG.8
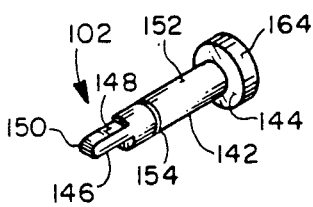
FIG.9
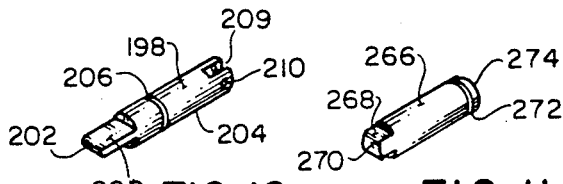
FIG.10  FIG.11
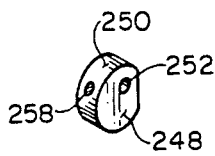
FIG.12
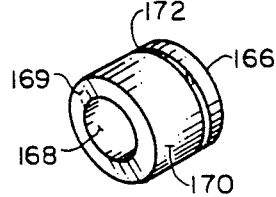
FIG.13
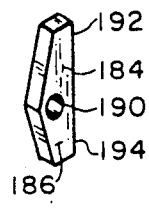
FIG.14
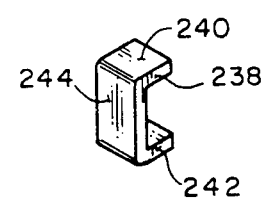
FIG.15
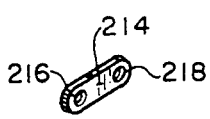
FIG.16
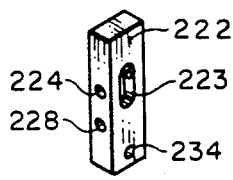
FIG.17
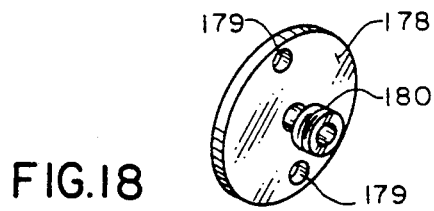
FIG.18

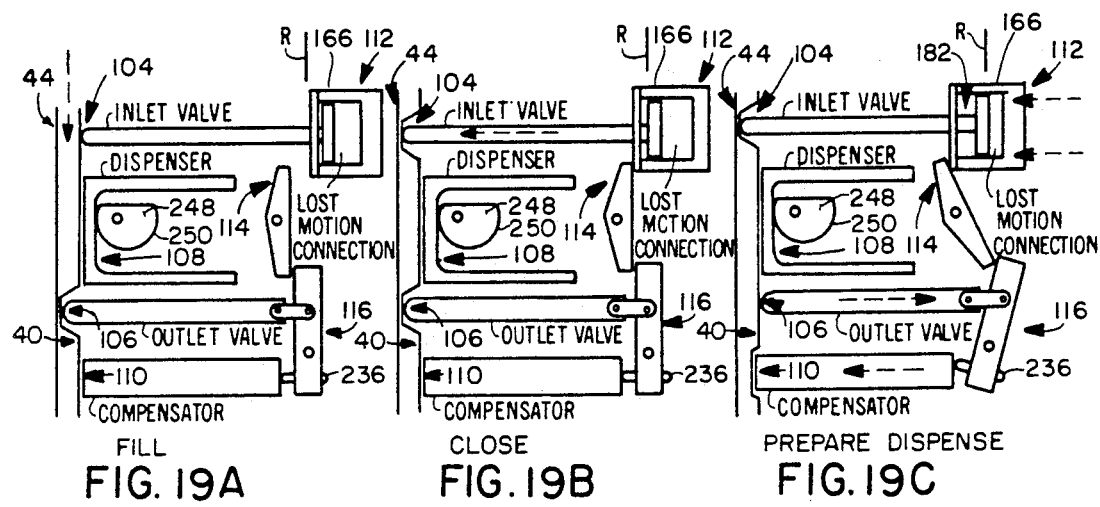
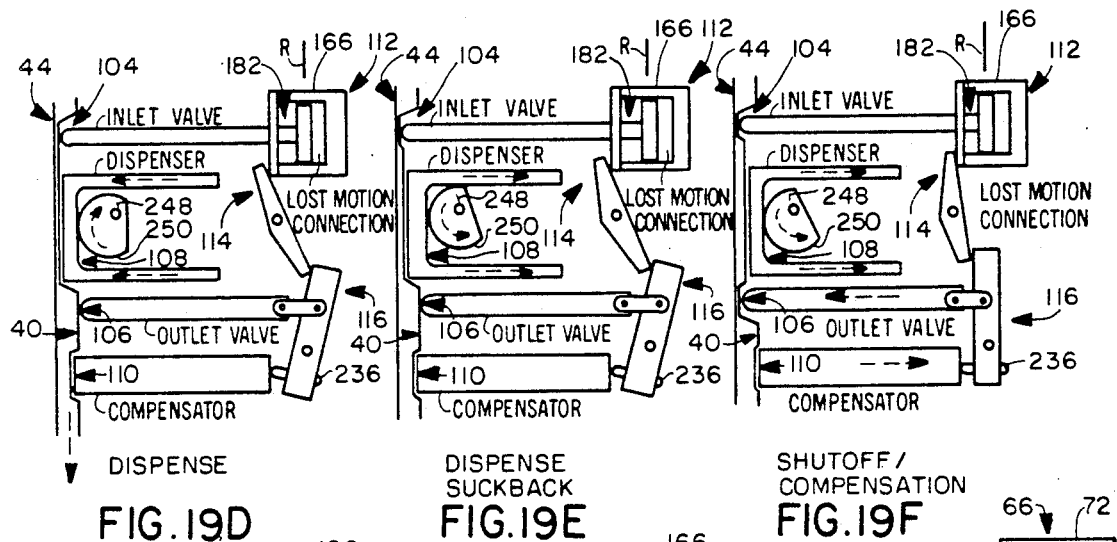
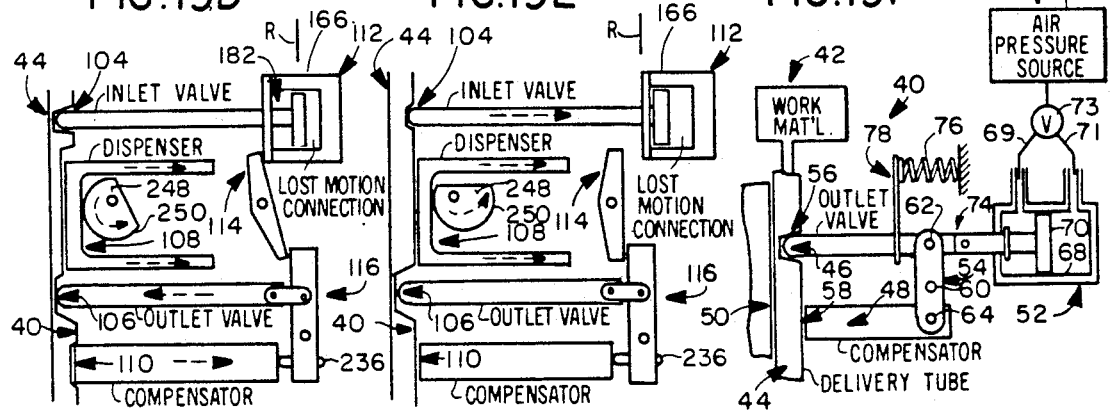

METHOD AND APPARATUS FOR PRECISION SQUEEZE TUBE VALVING, PUMPING AND DISPENSING OF WORK FLUID(S)

This is a division of application Ser. No. 07/313,389 Feb. 21, 1989 now U.S. Pat. No. 4,967,940.

BACKGROUND OF THE INVENTION

This invention relates to precision valving, precision pumping and precision dispensing utilizing a squeezing action for compressive action upon the side walls of a tube; both apparatus and method, certain of which have utility both alone and in various combinations. A compensator valve disclosed herein has wide application for interruption of flow independent of its particular usefulness in the disclosed valve/pump and/or precision dispensing systems.

The disclosed new precision positive displacement valve/pump using the compensator valve and precision dispensing mechanisms and methods are useful in dispensing work fluids of wide variety and are particularly useful for deposition on a substrate and "dumps" for potting, etc. They are also very useful in the individual low volume high precision depositions application of work fluids at a high repetitive rate of separate depositions.

Precision flow control and precision dispensing is affected by characteristics of the flowable work material being dispensed. Among the flowable work material characteristics which affect shut off or control of flow and/or repeatable, practical precision using positive displacement type pumping and dispensing are the characteristics of (i) viscosity, (ii) chemical stability, (iii) the amount and character of the particulates in the work material, (iv) material thermal properties, and (v) the air and/or other gas in the work material both inherent and entrained. Among the wide variety of materials which may be pumped are acrylics, anaerobics, braising pastes, conductive epoxys, cyanoacrylates, epoxys, lubricants, potting compounds, sealants, silicones, solder creams, and solder masks.

Constriction of a squeezable tube for flow control is a well known art. By squeezing a flexible tube shut, (sides meet) flow of a work material internally of the tube is interrupted. Conversely, the flow of the work material is permitted when the squeezing thereof is relieved due to the resilience of the tube itself coupled with a head or other source pressure on the flowable work material.

The act of squeezing a resilient tube shut at some point intermediate the ends of the tube inherently displaces the flowable work material in the tube in the area being squeezed together. Simply put, the flowable work material must go somewhere (assuming the work material is substantially non compressible): When the tube is squeezed shut, either ballooning the tube and/or forcing the material back toward source and/or as is the more usual, when the constriction functions as an outlet shut off, it causes a displacement discharge through the outlet.

The usual means of causing shut off of flow is by causing a movable member to have squeeze action against a tube located intermediate it and a fixed anvil or group of movable members move toward both the tube and each other. The moving members action is generally reciprocal and generally at right angles to the axis of the tube, although roller squeezing and cam action squeezing are also well known and here the usual attack/retreat angle of the movement of these members is not at right angles to the tube axis.

There are applications for the shut off of flow where displacement because of squeezing of the tube during shut off is not desirable. This occurs where, for example, control of the flow is desired in that range of infinitesimal flow to that amount inherently imposed by the displacement surge during squeezing action of shut off. Also surge or pressure changes on the flow because of shut off may be unwanted in some particular systems application(s).

A shut off type valve for squeezable tubes which does not have a displacement surge affect on outlet flow from the tube is particularly advantageous in precision dispensing of minute adjustable quantities of work material on a substrate, as in dispensing tiny dots of work material on very tiny electronic/electrical circuit board or chip substrates. Also such a non-displacement type of shut off is desirable where another displacement means (a separate displacement member usually having much more surface area that the shut off member) is associated with the tube for displacement pumping. Thus the quantity of material being displaced is put under the control of the displacement means, rather than the combination of the displacement means and the shut off member. By use of a nondisplacement type shut off, when the displacement means is adjustable or controllable to adjustably control volume being displaced, the range of adjustment is inherently increased when contrasted with a displacement type shut off, since the threshold amount of displacement caused by shut off is eliminated. Operational control of the displacement pump may also be simplified, since control is essentially associated with one part of the pump. This is advantageous particularly in systems where programmable aspects of the displaced volumes is discrete such as in computer or programmable logic controller control of the displacement means of the pump.

In those applications requiring precision dispensing which are associated with manufacturing processes, the practical requirements of any dispensing system are low cost, reproducable precision at quite high speed, sufficient throughput for the application needs, and if it can be provided at reasonable low cost, versatility and adjustability, versus dedicated single usage. It is helpful in most manufacturing environments that the dispensing apparatus and method be adapted to be controlled by and combined with a programmable controller which will coordinate the various parts of the apparatus and in some environments may simultaneously coordinate the workpiece area for movement of work pieces relative to the dispensing outlet(s).

Squeezable tube pumps find commercial appeal in dispensing of multiple source work liquids that are delivered to a mixer prior to delivery to a dispensing outlet, and are very appealing in dispensing many single component or pre-mixed multiple component work fluids. They also enjoy usefulness in single or multiple outlet dispensing and may also find usefulness downstream of a multi-component mixer intermediate the outlet of the mixer and the dispensing head.

Dispensing apparatus using squeeze tube pumps are particularly useful in Z towers and/or in XYZ movable head and/or movable work area apparatus type devices. Further, where the character and nature of the work material being pumped to the outlet does not afford easy clean up, they may be used with disposable tubes which may be replaced after a work shift or other discrete segment of use. They are also well adapted for use with cartridge types of work materials where a multi-component type work material is pre-packaged in a cartridge for later dispensing. For example some modern precision dispensing systems use a cartridge of work material which prior to use is kept frozen or at a low temperature to deliberately slow chemical action. The cartridge is then thawed at the manufacturing site just prior to dispensing and then dispensed in the interval prior to the work material becoming unmanageable for pumping.

It will be appreciated that the work piece areas beneath (or above) the dispensing outlet(s) may be characterized as locating a temporarily fixed work piece, or a work piece which is subject to rotational movement or is continuously or intermittently movable in some combination of linear or rotational movements and/or a part of an automatic work piece transfer system. It will also be appreciated that there exist manufacturing environments where the precision deposition required is of a nature where the work material after deposition essentially should contain no gas. In some high precision electronic/electrical applications, the electronic/electrical components may require very close tolerances of final characteristics of the deposited work material. These work materials when dispensed in normal circumstances would have entrained gases therewithin which can change the desired electrical characteristics of the deposited bead, dot or encapsulation type work material on/in the workpiece. Where substantially gas free ultra-high precision deposition is required, many of these work materials may be degassed by vacuum techniques prior to dispensing and then further degassed for dispensing in a vacuum chamber so as to completely or almost completely degas such material.

Another important aspect of precision dispensing is the characteristics and needs of the particular application envisioned, i.e. what type of deposition is needed with respect to the workpiece. For example, dispensed dots in sizes ranging from almost microscopic up to those of sizes in the vicinity of ¼ inch diameter (and larger) are used in manufacturing. Additionally some applications may require a continuous or discontinuous bead in straight line, rectilinear or triangular configuration, or arcuate or circular configuration, and/or a relatively large volumetric deposition in a single dispensing shot such as may be used in encapsulation or potting type applications.

The highest precision automatic dispensing system with greatest versatility involves positive displacement and any of a variety of pumping hardware and related hardware options, a personal computer, a programming system and a control system. The programming (software or handwired board or combination) involves a PATTERN program, a CONTROL program and a SYSTEM program. The purpose of these three programs is to afford user adjustability and preferably involves a screen readable approach.

The purpose of the PATTERN program is to create and store a program for execution of the dispensing of a preselected particular work material upon a preselected particular type of work piece part with the particular dispensing hardware and related hardware involved in the system. Ideally the PATTERN program will include multiple capabilities, such as plotting a program, imaging the program (and/or printing) on a screen, the ability to clear and start over, the ability to retrieve a prior developed program or pattern, the ability to edit a pattern, the ability to store and/or delete a pattern, the ability to name or rename a pattern, the capability of editing a pattern and ability to enter and/or exit the PATTERN program. The very sophisticated PATTERN program will provide for movement of the dispensing head in X/Y/Z planes in coordination with positive displacement pumping and will afford programming of directional movements of the dispensing head, velocity of movement, line movement, circular movement, arcuate movement, rectilinear movement, pause capability, speed capability and a host of coordinating capabilities regarding relationships with other components of a larger system (employing for example work material heaters/vacuum degassers/work material source conditioning/and work piece movers. Importantly, it will provide the programs for the positive displacement pumping of work material in specific relative locational aspects of the work piece and the dispensing outlet(s). The PATTERN program in its sophisticated form will also include communication capability with other devices. It also somewhat overlaps with the CONTROL program.

The major purpose of a CONTROL program is to execute the PATTERN program that is created (either newly created or previously created and stored). Ideally, in addition to mere execution it will have some powerful other capabilities. A sophisticated control program will allow adjustability of speeds of execution, adjustability of locations of execution, easy selection of any previously created or newly created program, a "jogging" of the output head to operator selected positions (by tracing, etc. around a work piece and/or templet and/or plotting board or drawing) and recording the position for future repeating and a host of other set up procedures. For example, dimension(s) of work area space for movement of heads may be changed, number of work units to be addressed may be changed, the tolerance of error may be changed, the flow time delay may be changed and the "size of the fill" stop may be changed. Also the status of various components of the hardware maybe ascertained for on/off or sequencing of movements of other portions of the system (such as movement or non-movement to preselected positions for valves, the X position of the dispensing head, the Y position of the dispensing head, the Z position of the dispensing head, the dispensing level of the source, the velocity of movement of the head and/or work piece in various planes or axis and percent of velocity of movement relationships. These may involve coordination of various types with movements and relationships with themselves or other operations and events. A sophisticated CONTROL system will also afford a manual and/or automatic purging to the dispensing head and/or source of work material and/or tubing/piping/valves/needles/mixers, etc. The purging may be necessitated to address such problems as clogging by work material and/or for gas bubbles and may be used in conjunction with or without a vacuum degassing system.

The purpose of the SYSTEM program is for determining the logic by which the entire dispensing system operates. It preferably has decision making capability, and may be simple or very sophisticated such that it may interrelate to or with other computers and/or systems. Once this logic is established, the CONTROL program will work based upon the logic in the SYSTEM program, i.e. it is a fundamental damental to the CONTROL program. The CONTROL program will await for certain input signals and then act upon those input signals. It may await certain commands from a computer and may download commands to a computer. A powerful SYSTEM program affords intercommunication not only with components of a large system but additionally with the operator/user. A sophisticated SYSTEM program ideally, once determined and established, will not be changed, however capability of change of the logic structure is desirable.

The highest precision dispensing apparatus and systems having versatility will include hardware capable of moving an outlet(s) in any of 3 or more axis; are useful with a variety of work materials; are adaptable for dispensing single or multiple slots to a work piece(s) with controlled volumes in any preselected pattern or amount; are characterized as being operable to coact with a variety of work piece movers, work material controls, and ambient or contrived environmental situations (vacuum or pressurized); and include hardware and components which will respond with high precision to software capable of afore generally described PATTERN, CONTROL and SYSTEM programs.

A squeezable outlet valve per se is shown in the co-pending application entitled *Method and Apparatus for Precision Pumping, Ratioing and Dispensing of Work Fluid(s)* having Ser. No. 07/118,330 filed Nov. 6, 1987 and assigned to the same assignee now U.S. Pat. No. 4,921,133, issued May 1, 1990. In that apparatus the squeezable tube is located intermediate the output end of the mixer and the dispensing outlet but in essence operates as a shut off valve with the upstream movement of the roller providing some suck back characteristics. The roller shut off valve is essentially on/off and is operated in conjunction with a piston/cylinder pump. This pump is driven by a precision stepper motor which in turn is computer controlled.

The nature of the aforementioned apparatus of the co-pending application is such that the positive displacement mechanism (piston/cylinder) is relatively large in size and is cumbersome in nature. The apparatus requires a relatively large base, frame, and support mechanism and inlet/outlet valving remotely located from the work piece area and the outlet(s). Also, the pumping is quite remote from the roller on/off squeeze tube dispensing valves. The system shown also requires on/off valve(s) associated with the positive displacement pumping in addition to the roller shutoff squeeze tube valve. While the aforementioned apparatus taught in the copending application teaches extremely fine precision control of single and multiple work fluids with multiple outlets for dispensing, and the coordination control of the positive displacement pumping with other moving parts of the apparatus, it is relatively bulky and expensive. The co-pending disclosed piston/cylinder positive displacement pump(s) mechanism can be advanced or retreated in exceedingly small increments or steps. Because the co-pending disclosed ball screw mechanism operates through a gear reducer and has inherent mechanical advantages itself, it will produce relatively large torques to dispense a relatively large mass of flowable work material with very good control capabilities on volume dispensed. Also that apparatus is also well adapted for fairly large volumetric dispensing quantities with an almost infinite adjustment of the volume.

In addition to cost, positive displacement piston/cylinder pumps are not well adapted for use with all pumpable materials, including many of those hard to pump types such as those with high particulate content. They are also not well adapted for disposable type cartridge packed work materials or fast setting or other material(s) which cause clean up to become onerous. A movable piston/cylinder type pump of the aforediscussed co-pending high precision type is not well adapted to be "hung" of a Z tower or disposed on the end of a Z arm of an XYZ mechanism. Further the copending squeeze tube shut off valve does displace material upon shut off which defines a lower threshold limit of volume of material to be dispensed.

Positive displacement pump dispensing apparatus where a squeezable tube is used in the system is shown in an issued patent in the prior art. In addition to the aforementioned co-pending application, a positive displacement system using a squeezable tube in the system is shown in U.S. Pat. No. 3,932,055, entitled PNEUMATICALLY CONTROLLED LIQUID TRANSFER SYSTEM which issued Jan. 13, 1976. This system shows a pair of squeezable tubes; one tube is located intermediate the source and a piston/cylinder and the other intermediate the piston/cylinder and the outlet. They are so arranged that the mechanism requires the piston to engage the work fluid in the cylinder chamber apart from the squeezable tubes. (The inlet and outlet to the system both being squeezable tubes which are acted on by a valving mechanism which alternately shuts and opens the inlet and outlet in coordination with the piston/cylinder.) Here, because of the use of the piston/cylinder for displacement pumping, the system has the problem of not being usable for many hard to pump work materials and also is relatively expensive and cumbersome. It is not well adapted to be disposed on the end of a Z arm of an XYZ device. In essence this system shows both inlet and outlet valves for the pump using squeeze tubes, but the positive dispensing means does not work directly on the squeezable tube. The positive displacement of work material in this system is an inadvertent aspect of "shut off" valving.

Replaceable squeeze tubes are also shown in U.S. Pat. No. 4,450,981 issuing May 29, 1984 and entitled PRECISION MATERIAL FILLING SYSTEM. However this system is not a positive displacement system since work material flow is essentially caused by relief of the squeezing action, thereby allowing pressure in the source of the work material to cause flow (except for unintended displacement caused by shut off pinching).

A squeezable tube valve/pump mechanism is known to be marketed commercially in the United States under the name of SCM/Dispensit of Indianapolis, Indiana. In this mechanism, the movable inlet, outlet and displacement member all act directly upon the flexible tube. The anvil opposite the displacement member is manually adjustable to provide adjustability to the volume displaced by squeezing movement of the displacement member. In the SCM/Dispensit apparatus, the movable inlet, outlet and dispensing tube impinging members are each actuated by air cylinders in a timed sequence. The movable tube impinging outlet member (on/off) necessarily surges or displaces work material during shut off. The air cylinder actuator for the movable tube engaging dispensing member causes essentially on/off actuation. The construction appears to be such that a complex movement profile of the dispensing member alone or in conjunction with other tube engaging members, is inherently difficult. The 3 air cylinders cannot give lightweight extremely versatile control of the dispensing member at high speed.

The invention herein overcomes several of the noted prior art problems. In the instant invention, there is disclosed a new method and apparatus for shut off of flow of a flowable work material in a squeezable tube without causing a displacement surge because of the pinching action of the tube engaging shut off member.

In broadest concept, a compensator is incorporated which moves toward and away from the tube in opposite direction to the movements of the shut off member. The compensator has a size of tube engagement area substantially larger than the shut off member and the length of its corresponding opposite direction of movement is less than that of the shut off member. The relative size and stroke lengths are calculated to produce no displacement surge during shut off. In effect the compensator prevents a displacement of work material at the outlet of the tube because it is increasing the volume in the tube intermediate the shut off member and the outlet by the same amount that the shut off member is decreasing the volume as it pinches off.

The compensator member is made adjustable in connection with its length of stroke and its starting position. The starting position may be adjustably located such that it is possible to have a portion of its stroke of movement occur after the shut off member has closed the tube. By causing the compensator to continue movement away from constriction after the pinching, it causes a back pressure to be created. This back pressure is created adjacent the shut off movable member and creates a suck back of work material downstream from the shut off member. Because this portion of the stroke of the compensator member after the shut off is adjustable, it may be adjusted for materials of different physical and chemical characteristics. This adjustability of suck back is important in some applications where versatility is important. Also it is particularly advantageous for fine turning of a computer controlled dispensing pump. An operator, during set up, may adjust this one manual adjustment to account for small system tolerance variables and thereby does not require the operator "going into" and changing the software of the system (where computer control of the dispensor member is employed).

Also a major feature of the invention disclosed herein is a programmable movement of the dispensing member against the tube to provide pumping by positive displacement squeezing. Importantly, the movement of the dispensing member toward and away from the tube may have a complex movement profile as preselected by programing. It may advance/retreat/stop in any of an almost infinite variety of combinations as desired and may be controlled and coordinated with the inlet and outlet members movement. The incremental subdivision of movement are minute and may be in the range of 0.001 to 0.00001 inches or smaller. The coordination with the use of the disclosed PATTERN, CONTROL and SYSTEM programs is also adapted to extend to movement of the dispensing outlets in a single or multiple axis and/or with various work piece area movers and/or with other dispensing needs such as work material source control, heaters and degassing apparatus. It is well adapted for use in a wide variety of automatic or so called robotic assembly operations.

Also, the invention includes hardware such that the programmable actuator or mover for the dispensing member is capable of being of relatively light weight so that it may ba used on the end of a Z tower or on an XYZ movable head without sacrifice of desired precision. The actuator/mover shown and described is preferably a small stepper motor mounted directly on the valve/pump frame which in turn drives a cam. Other means could be employed such as a servo mechanism with an encoder instead of a stepper motor and various means of translation of the output of the stepper or servo could be employed for engaging the dispenser member (pinion/rack or ball/screw or metal band-/roller, etc.). However where relatively light torques are required, the stepper motor directly outputting to a driving cam is compact, lightweight, easy to mount and can provide (with electronic secondary stepping) approximately 50,000 steps per revolution to in turn provide exceedingly fine control of positive displacement dispensing movement.

Further, with the disclosed software, the PATTERN, CONTROL and SYSTEM programming may cause the stepper motor (or other actuator) to be easily coordinated with an equally precisely controlled movement of a dispensing head and/or work piece mover. By programming with the software and using the tiny incremental steps and the fast response movement of the stepper motor, the suck back of the work material at the outlet may be adjustably set for each work material. (Although, as aforementioned, when used with an adjustable compensator, it is preferred that both be used for suckback.) Suck back with the stepper motor is accomplished by moving the dispensing member from constriction toward relief of constriction prior to closing the shut off in the cycling of the tube pump and while the inlet is still closed to afford primary suck back.

Where the system usage requirements are such that the lower end of the range of volume of material being dispensed exceeds the threshold level imposed by the displacement volume caused by a shut off valve without a compensator, suck back can be accomplished solely by adjusting a slight retreat from pinching movement by the dispensing member prior to the shut off being effectuated.

In theory, the displacement pressure surge caused by the shut off member could also be compensated for by programmed movement of the dispensing member in a retreating direction so as to cause a "place" for the shut off pinching displaced material to go to. However, in fast repetitive pumping sequences, and because of movement lag caused by viscosities of work material combined with other complex work material flow affecting parameters, the use of a compensator to the shut off valve is preferred.

BRIEF DESCRIPTION OF THE DRAWINGS

In the drawings, which illustrate the presently preferred embodiments of the invention:

FIG. 5 is an isolated side elevational view of the valve/pump body;

FIG. 6 is a righthand end elevation of the body shown in FIG. 5;

FIG. 7 is a top view of the valve/pump body shown in FIGS. 5 and 6;

FIG. 8 is bottom view of the valve/pump body shown in FIGS. 5, 6 and 7;

FIG. 9 is an isolated perspective view of the inlet tube squeezing member having an enlarged outboard head cooperable to form part of a loss motion connection with the interior of the air cylinder piston member shown in FIG. 13;

FIG. 10 is an isolated perspective view of the outlet tube squeezing or shut off valve member with the outboard end having through bores for pivotal coaction with the link shown in FIG. 16;

FIG. 11 is an isolated perspective view of the tube squeezing compensator member having the tube engaging end surface approximately twice the size of the end surface of the tube squeezing outlet valve member of FIG. 10;

FIG. 12 is an isolated perspective view of the cam member which engagingly cooperates with the tube squeezing dispensing member shown in FIG. 15;

FIG. 13 is an isolated perspective view of the cup-shaped air operated piston member with the internal side walls of the piston being cooperable with the enlarged head of the inlet valve member of FIG. 9;

FIG. 14 is an isolated perspective view of the pivotal link which cooperates with the piston of FIG. 13 and with the end of link member shown in FIG. 17;

FIG. 15 is an isolated perspective view of the U-shaped tube squeezing dispensing member which has a tube engaging surface of substantially greater dimension than the tube engaging end surfaces of valve members shown in FIGS. 9 and 10;

FIG. 16 is an isolated perspective view of the link member that pivotally links the top of the shut off valve member shown in FIG. 10 to the link member shown in FIG. 17;

FIG. 17 is an isolated perspective view of the pivotal link between the compensator member of FIG. 11 and the shut off valve member of FIG. 10;

FIG. 18 is an isolated perspective view of the air valve cylinder cover with an air hose attachment inlet fitment extending outwardly therefrom;

FIG. 19A is a semi-diagrammatic view of the relative positions of the valve/pump parts respective to a reference point R when all of the parts are in the "fill" portion of the cycle;

FIG. 19B is a view similar to FIG. 19A showing the relative positions of the parts during the "closed" portion of the cycle;

FIG. 19C is a view similar to FIG. 19A and 19B showing the relative position of the parts during the "prepare to dispense" 60 portion of the cycle;

FIG. 19D is a view similar to FIGS. 19A-19C showing the relative position of the parts during the "dispense" portion of the cycle;

FIG. 19E is a view similar to FIGS. 19A-19D showing the relative position of the parts during the "dispense suck back" portion of the cycle;

FIG. 19F is a view similar to FIGS. 19A-19E showing the relative position of the parts during the "shut off/compensation" portion of the cycle;

FIG. 19G is a view similar to FIGS. 19A-19F showing the relative position of the parts during the "compensation suck back" portion of the cycle;

FIG. 19H is a view similar to FIGS. 19A 19G showing the relative position of the parts during the "shut off prior to fill" portion of the cycle and return of the parts to the initial position of FIG. 19A;

FIG. 20 is a view of an alternate structure and system shown in semidiagrammatic form, showing an outlet valve and compensating member for preventing displacement of work material during shut off of flow in an apparatus;

DETAILED DESCRIPTION

Figure 1:
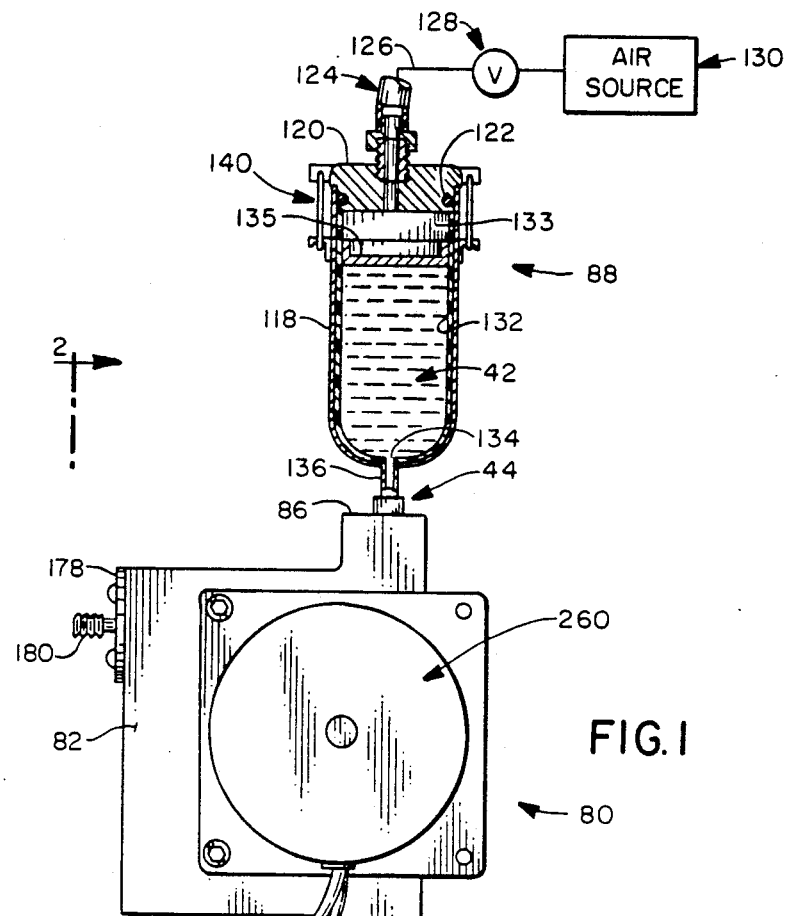
FIG. 1 is a front elevational view (in isolation from the rest of the apparatus), partially in section, illustrating the valve/pump of a precision dispensing system.

The broadest concept of utilizing a compensator valve means 40 for permitting and preventing movement of a flowable work material means 42 through a flexable tube means 44 by relaxation/squeezing the side walls of the tube means 44 is shown in FIG. 20 and as a part of the valve/pump apparatus shown in FIGS. 1 through 19.

As shown in FIG. 20, the compensator valve means 40 comprises a shut off valve means 46, compensator means 48, anvil means 50 and operator means 52. The shut off valve means 46 and compensator means 48 are linked together through pivotal link means 54 for simultaneous opposite direction movement. The squeezing and relief from squeezing of the tube means 44 for shut off/flow is caused by the reciprocal movement of the shut off valve means 46 toward and away from the anvil means 50 while the compensator means 48 moves a lesser distance and in the opposite direction to movement of the valve means 46.

As shown, the shut off valve means 46 and compensator means 48 respectively each have a tube engagable end surface means 56 and 58 which are characterized as being of deliberatively different sizes (surface areas). The compensator end surface means 58 is larger than the size of the end surface means 56. It will be appreciated that the internal diameter of the tube means after the constriction on the tube means 44 is imposed by the compensator end surface means 58 when it is at its extreme tube squeezing position, in effect defines the internal flow diameter of the tube means 44 during flow of work material.

The pivotal link means 54 has a pivot 60 and is operatively connected to each of the shut off valve means 46 and the compensator means 48 through suitable means such as the pivot pins 62 and 64 shown in FIG. 20. The three pivot points 60, 62, and 64 are so located relative to each other so as to cause different lengths of strokes of movement of the shut off valve means 44 relative to the compensator means 48, the length of stroke of the compensator means 48 being less than that of the shut off valve 46. The geometry of the exact stroke (and hence the location of pivot points) is determined by the relative size of the respective end surfaces means 56 and 58. The design criteria involved is to have the strokes of the shut off valve means 46 and compensator means 48 proportional to the sizes of the end surfaces 56 and 58 whereby there is substantially no volumetric change interiorly of the tube means 44 upon either advancing or retreating between closure and full open positions of the engagement of the shut off valve means 46 with the tube means 44. For example, when surface 58 is 2 times as large as surface 56 then the pivots 60, 62 and 64 are arranged so that the stroke of the compensator means 48 is substantially ½ of the stroke of the shut off valve means 46. There is provided in the length of stroke a slight overtravel of the shut off valve means. The compensator means initial partial tube squeezing position is such that when the shut off valve means moves to its initial closing position, the compensator means has moved to a new position which still slightly compresses the tube means. The effect of the compensator means 48 is to substantially effectively maintain a constant volume during pinching shut off and relief from pinching opening of the tube means 44 so that surge is prevented. Thus there is no displacement surge of work material means 42 when the shut off valve means 46 closes the sides of the tube means 44 since the compensator means 48 is increasing the volume at the same rate and vice versa. The pivot points 60, 62 and 64 are so arranged that there is slight overtravel of the end surface 56 after it causes initial closure of the side walls and slight further relaxation of the pinching of the side walls of the tube means 44 by the surface 58 after such initial closure. This provides pull-back or suckback of work material and thus prevents drip.

The operator means 52 shown in FIG. 20 is shown diagrammatically and comprises a double acting air piston means 66 having a cylinder means 68, a piston 70, an inlet means 69 and outlet means 71. Air pressure source means 72 is connected to the operator means 52 through a suitable valve means 73. The piston 70 is connected to the shut off valve means 46 through connection means 74. Bias means 76, here shown as a coil spring, cooperates with shoulder means 78 on the shut off valve means 46 to bias same toward a tube squeezing closed position.

In operation of the device shown in FIG. 20, valve means 73 controls air to the inlet means 69 to cause the outlet valve means 46 to open from its tube 44 squeezing position against the bias of spring 76. The valve means 73 is of well known construction, may be electrically or pneumatically operator operated and operable to alternately place air pressure on opposite sides of the piston to open and close flow through the tube means 44.

The opening of outlet valve means 46 causes the compensator means 48 to move to a partial tube squeezing position to allow the flow of work material means 42 there past. When valve means 73 causes air pressure on the inlet side of the piston 70 to be relieved, the spring 76 bias causes end surface 56 to pinch the tube to its initially closed position. The geometry and relationships aforementioned prevent occurance of a displacement surge of work material 42. Further slight overtravel of end surface 56 causes the surface 58 to move from its still partially close position (although much less than the initial position) to a non-squeezing position.

The particular operator means 52 disclosed is one of many types that may be substituted and may be used without sacrifice of precision shut off without surge. This compensated shut off, as will be apparent, is very useful when coordinated with a positive displacement dispensing pumping system now to be described.

A sophisticated tube valve/pump apparatus 80 is shown in FIGS. 1 through 4D with several parts being shown in isolation in FIGS. 5 through 18. The apparatus 80 may be described as a valve/pump means since it has the characteristics of positive displacement pumping with coordinated inlet and outlet valving.

Figure 2:
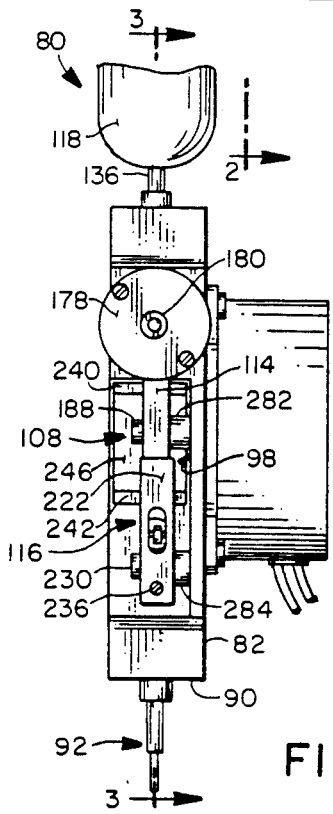
FIG. 2 is a side elevational view taken along lines 2—2 of FIG. 1.
Figure 3:
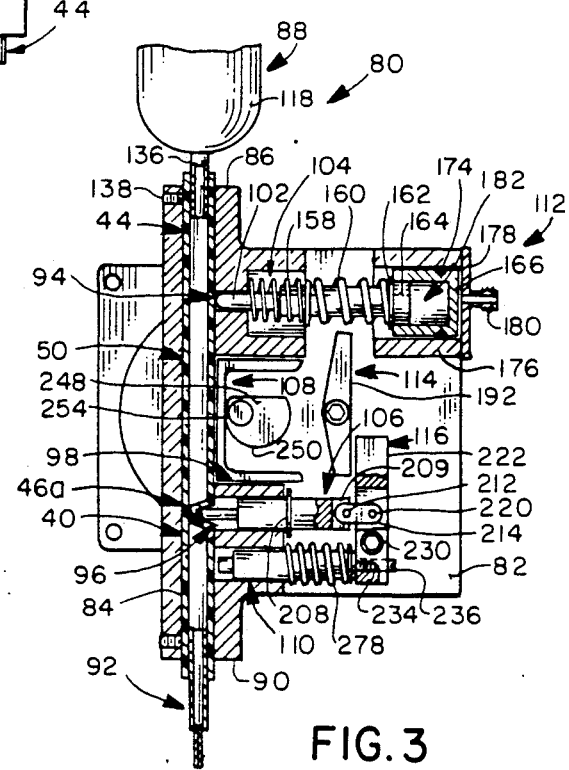
FIG. 3 is a sectional view along lines 3—3 of FIG. 2.
Figure 4A:
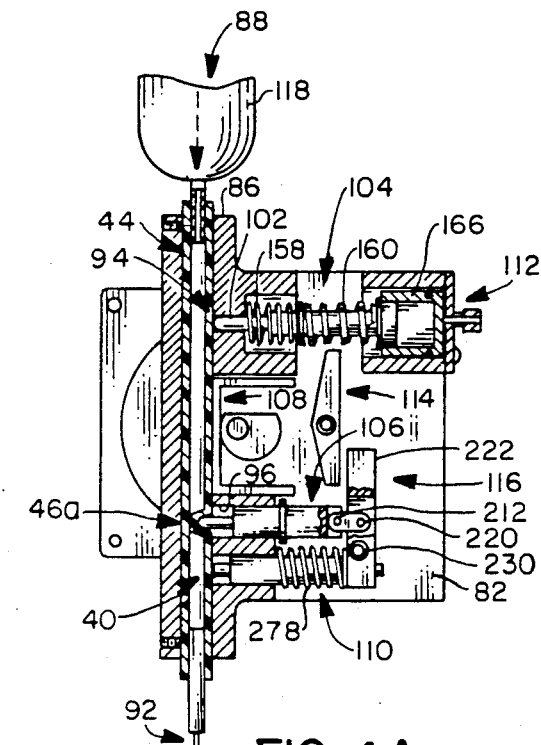
FIGS. 4a through 4d are sectional views similar to FIG. 3 showing the sequential relative positions of the parts at certain stages in an operative cycle of the pump valve.
Figure 4B:
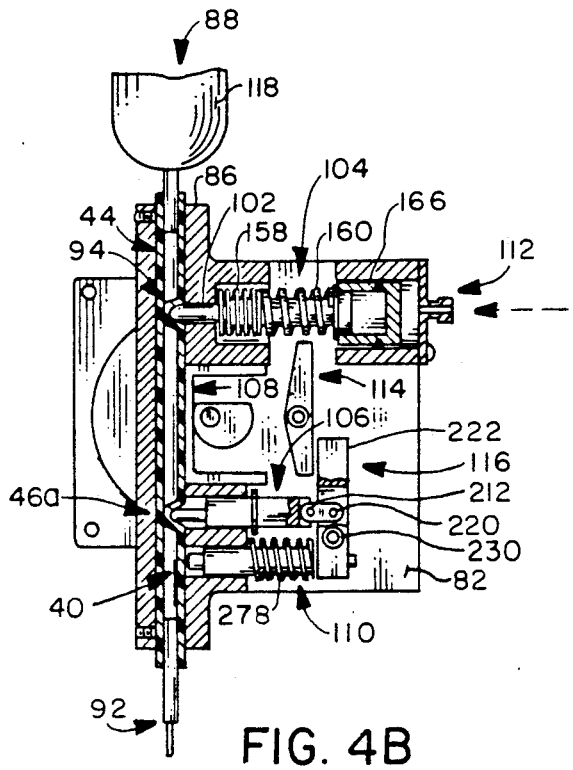
Figure 4C:
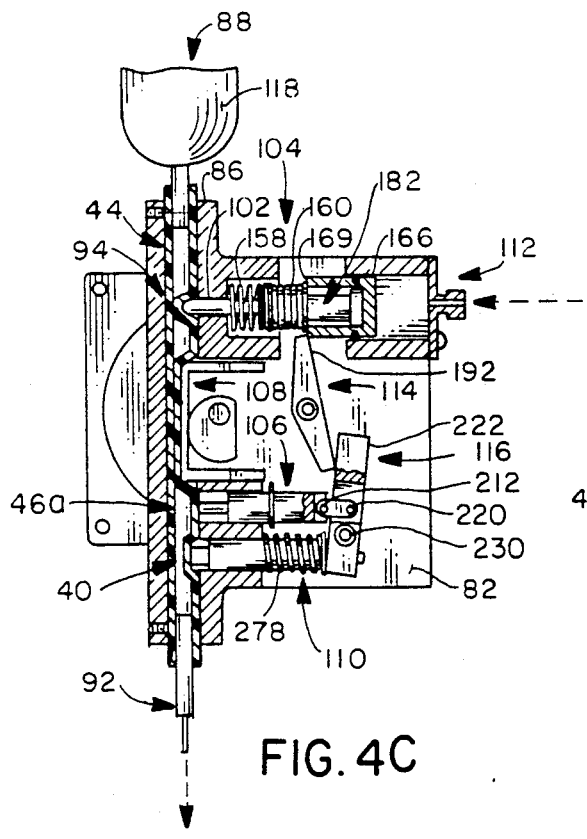
Figure 4D:
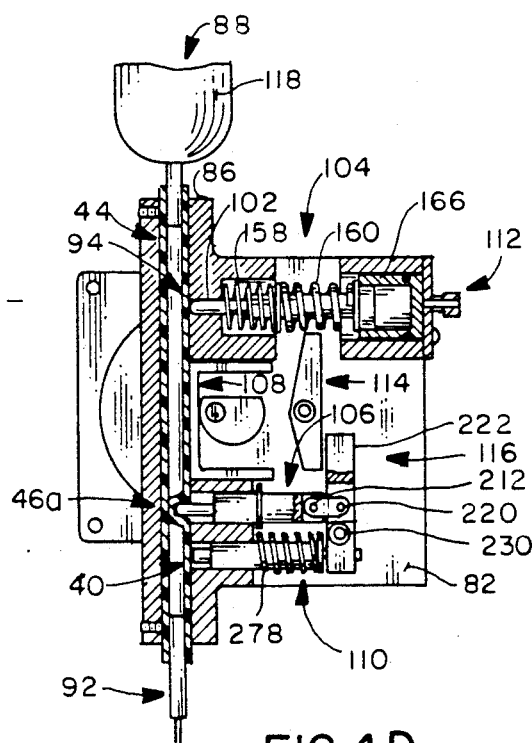

The apparatus 80 comprises a tube pump body 32 or base which is shown in isolation in FIGS. 5 through 8 and in cross section in FIGS. 3 through 4D. The tube pump body 82 is formed with a tube through bore 84 for receipt of the disposable flexible tube means 44 shown disposed therewithin. The bore 84 has an upper and lower portion and is shown in dotted lines in FIG. 5, the upper portion exiting the tube pump body 82 at the inlet end 86 for connection with a work material source 88. The lower end of through bore 84 is the outlet end 90 and as shown in FIGS. 1 through 4D may have mounted adjacent thereto a dispensing needle means 92 which is the outlet means for the apparatus 80.

One side of bore 84 (the left as viewed in FIGS. 3, 4A-4D and 5) is the anvil means 50 of the tube pump apparatus 80. Four opening means 94, 96, 98, 100 are formed at substantially right angles to the long axis of and intersect with the bore 84 on the side thereof opposite to the portion thereof forming the anvil means 50 (openings 94, 96, 98, and 100 are best seen in FIGS. 5-8). As viewed in FIGS. 3-5, the upper opening means 94, receives the small end 102 of a first tube squeezing means 104 (shown in isolation in FIG. 9). In the apparatus 80, this end 102 squeezes the side wall of the tube means 44 against the anvil means 50 and forms the inlet valve means for the assembly. It operates in coordination with other tube squeezing means as shall be described.

The third from the top opening means 96 as viewed in FIG. 5 in the pump body 82 receives the second tube squeezing means 106 which is the shut off valve means 46a of the assembly 87. It will be recognized that valve means 46a is similar to the aforediscussed shut off valve means 46 of FIG. 20. The second opening means 98 as viewed from the top of the body 82, accepts the third tube squeezing means 108 which is the movable dispensing member for the assembly 80. It will be observed that the third tube squeezing means is located intermediate openings 94 and 96 and is under computer or controller control which shall be later described. The opening means 98 is three sided as shown at 93a, 93b and 93c and of generally rectilinear configuration as viewed in the side elevational view of FIG. 6.

The fourth from the top opening means 100 is the bottom opening. It accepts the fourth tube squeezing means 110 for movement therewithin. The fourth tube squeezing means 110 is generally similar to the compensator means 48 of FIG. 20 with the addition of capability of adjustment relating to its stroke length as shall be described.

Operator means 112 (here shown as air operated) for the first tube squeezing means 104 provides reciprocating movement for inlet control. The operator means also actuates the second tube squeezing means 106 for outlet control of work fluid pumped by the apparatus 80. The first and second tube squeezing means 104-106 are coordinated in their movement through a first pivotal link means 114. This first link means 114 actuates second link means 116 which has similarities to link means 54 of FIG. 20. Each link means 114 and 116 will be more fully described as will the coordination of the first and second tube squeezing means 104, 106 which are the inlet and outlet of the apparatus 80.

The apparatus 80 is shown approximately full size in FIG. 1 although the size of work material source means 42 may vary dramatically from that shown. The apparatus 80 is well adapted to mount work material source means 42 in the form of a cartridge type work material of the flowable type that are premixed, one type of cartridge being shown in FIG. 1 in semidiagrammatic cross section. The work material source means 42 comprise a cartridge holder 118, a cover 120 with 0 ring sealing means 122, suitable air inlet means 124 connected with pipeing 126 through valve means 128 to air source means 130. The holder 118 mounts a disposable cartridge 132 having at the lower end (as viewed in FIG. 1) an outlet 134 of reduced size which aligns with the depending neck 136 of the holder 118.

The cartridge has an internal movable followar 135 which is driven down the inside walls of the cartridge by air pressure from source 130 through valve 128 and pipeing 126 to cause flowable work material in the cartridge to exit the neck 136 into flexible tube means 44 when flow is permitted by the first tube squeezing means 104. A valve body retaining means 138 is provided to hold cartridge neck 136 to the valve body 82. Thus the supply of work material may be mounted directly to the pump/valve body 82 for movement therewith as shall be discussed with respect to FIGS. 25 and 26. A cartridge cover latch means 140 is provided to hold cover 120 to cartridge holder 118 for easy quick removal and replacement of the cartridge 132.

The inlet means for the apparatus comprising the first tube squeezing means 104 and operator means 112, further comprises a pin 142 (see FIG. 9) with an enlarged diameter disc-shaped outboard head 144 at the end opposite to the tube 44 engagable small end 102. It will be noted that small end 102 is formed with opposed flat sides 146 and 148 terminating in end surface 150. The sides 146-148 slide the transverse upper opening means 94 of frame 82 so that end surface 150 may move into and out of squeezing engagement with tube means 44 to prevent and permit the flow of work fluid means 42. The pin 142 has an elongated pin body 152 which is generally cylindrical in character and is formed with a groove 154 which mounts a C-ring 156 or other suitable washer to provide a shoulder means on the pin body 152. The shoulder means 156 engages two springs, the lower spring 158 and the upper spring 160 each of which surround the pin body 152. The lower spring 158 is of much lighter spring gauge than uppe spring 160 (shown by differential in thickness as for example in FIG. 3) and requires more force to compress it. Spring 158 is sufficient to return the pin 142 and piston 166 against their own friction. The desired relationship is that lighter spring 158 will completely compress before spring 160 compresses for reasons to be described. The lower spring 158 is located in counter bore 94b of opening 94. The lower end of spring 158 engages counter bore end surface 94a and the upper end will engage the shoulder means formed by C-ring 156.

A suitable washer 162 having an OD larger than the diameter of head 164 and an ID larger than the diameter pin body 152 is slideably positioned adjacent the under surface of disc-shaped head 144. The upper spring 160 is trapped between C-ring shoulder means 156 and slideable washer 162.

The cup-shaped piston 166 (see FIG. 13) has an ID 168 of predetermined size slightly smaller than washer 152 which slideingly admits the OD 164 of disc shaped head 144. A piston end surface 169 formed between the ID 168 and OD 170, engages washer 162 and allows relative motion (loss motion) between the piston and the pin head 164. The OD 170 is formed with a groove 172 to sealingly receive an O-ring 174 which engages both the bore 176 and the groove 172. The bore 176 is larger than and coaxial with bore 94b in valve body or frame 82.

Figure 24:
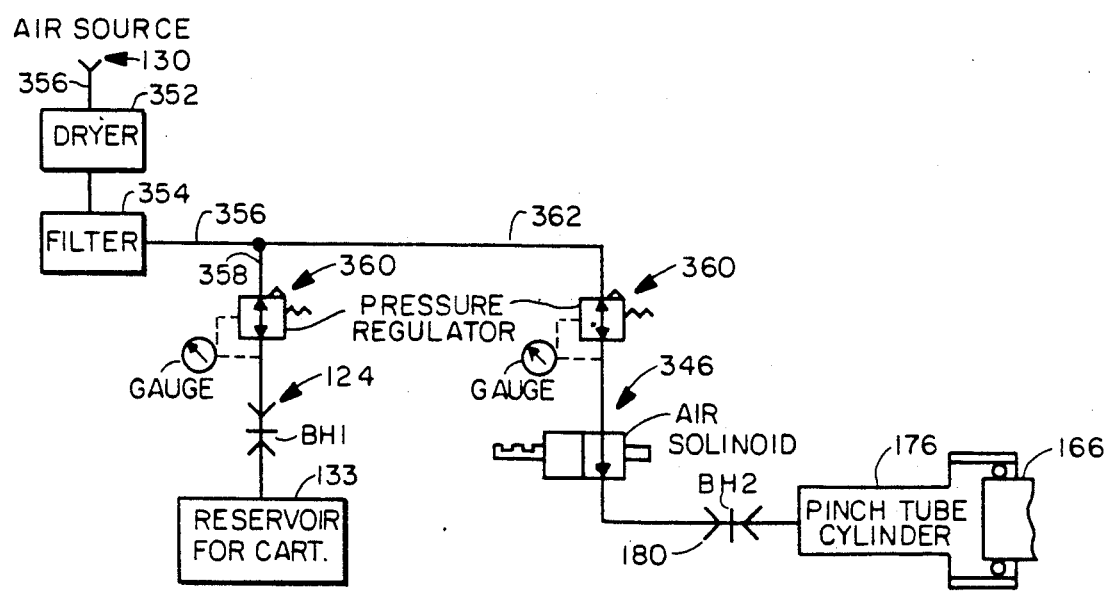
FIG. 24 is a schematic view of the air circuitry for the device shown in FIGS. 1-19H.

A cover 178 for the bore 176 is shown in FIG. 18. The bore 176 together with cover 178 form an air cylinder chamber with cover nipple 180 being attachable to an air source by suitable means in an air circuit as shown in FIG. 24 and as will be described. The cover 178 is mounted to valve frame 82 by suitable bolts in the bores 179 in cover 178. It will be observed that the arrangement of parts and location of the elements form a lost motion connection means 182 of piston 170 and pin 154 when air is admitted to the cylinder bore 176 for cyclical actuation purposes that will be discussed.

The apparatus 80 further comprises first pivotal link mean 114 which has a first link arm 184 and a second link arm 186, oppositely extending from pivot bore 190 which mounts pivot shaft pin 18B. Link outboard end 192 extends from pivot pin bore 190 a distance great enough to operatively engage end 169 on piston 166 for pivotal movement. Outboard end 194 on arm link 186 is engagable with the second pivotal link means 116. Shaft pin 188 is mounted on valve body/base 82 in bore 196.

The second tube squeezing means 106 comprises pin body means 198 (see FIG. 10) having a reduced end portion 203 with an end surface 202 of predetermined tube engaging surface area. The pin body means 198 has a generally cylindrical surface 204 with an annular groove 206 to mount a C-ring or split washer 208. A crossbore 210 through a slot 209 at the top of pin 198 mounts pivot pin 212 in bore 216 of a short link 214 which connects pin 198 to the second link means 116. Bore 218 in link 214 mounts pin 220 which extends through aperature 223 in the body 222 of the second pivotal link means 116 and through bore 224, to pivotally join link 214 with the second link means 116. The C-ring or split washer 208 forms an overtravel shoulder stop to limit the movement of pin means 198 in its tube squeezing action by engagement with boss 226 surrounding valve body bore 96.

Link body 222 is also formed with a pivot bore 228 to mount link pivot shaft 230. Shaft 230 is also mounted in pivot bore 232 in the valve body 82. The link body 222 has a threaded bore 234 at right angles to the bores 224 and 228 for mounting an adjustment screw 236 which is mounted therein for engaging the top of the compensator and adjusting the relative relationship of the 2nd link means 116 with the end of the compensator (fourth tube squeezing means 110).

The third tube squeezing means 108 comprises a U-shaped tube engaging member 238 having spaced legs 240-242 which are confined and slide in opening side walls 98a and 98c of the dispensing means opening 98 of the valve body 82. The tube engaging surface 244 is the transverse portion of the U-shaped member connecting legs 240 and 242. Surface 244 has very large tube engaging surface area compared to surfaces 150 and 202. The opposite side 246 of the transverse tube engaging portion 244 is engagable with and held in place by the cam member 248 having a rotatable cam surface 250. Cam member 248 shown in FIG. 12, has a bore 252 for receiving cam drive shaft 254 (extending through valve body bore 256) and is fixed thereto by a suitable set screw (not visible) in a threaded bore 258. A suitable bushing for shaft 254 is used and it is driven by a control means such as stepper motor means 260 which is under control of a CPU means 262 having indexer means 264. These electrical/electronic control means will be further described in connection with FIGS. 21-26. It should be noted that the stepper motor means 260 may alternatively be under the control of a dedicated programmable controller rather than the CPU computer means 262/indexer means 264/driver means 263, etc. later described. This is particularly true when the tube pump apparatus 80 is used in a stationary position and relatively simple relationships to other components are needed.

The stepper motor means 260 may be any of several commercially available types depending upon the degree of fineness of control of the work material needed for an application or range of applications. The number of discrete steps per revolution is one measure of fineness of control. For example, a 50 step/revolution stepper motor available under the trade name SLO SYN is acceptable for moderate precision, as is the Sigma Instruments, Inc. general purpose series 20. When ultra high precision is required for dispensing, a 200 step/revolution SLO SYN motor with microstepping (up to 50,000 steps/revolution) by electronic means with for example a bilevel step motor driver sold by Anaheim Automation, BLB series may be employed. Since the rotation of the shaft 254 in turn causes rotation of cam surface 250, the degree of control of movement of dispensing member 242 for every fraction of movement of shaft 254 is further determined by the shape of cam surface 253 as will be well understood.

The fourth tube squeezing means 110 forms part of the compensator means and comprises cylindrical pin member 266 having a reduced size lower shank portion 268 which is extendable into opening 100 of the valve body 82. The lower shank portion 268 terminates in an end surface 270 which is substantially smaller than dispensing member surface 244 but is larger than shut off end surface 202. Here the size of the shut off tube engaging surface 202 is approximately $\frac{1}{2}$ of the size of the surface area of the compensator tube engaging end surface 270. Thus approximately twice the movement of surface area 202 will displace the safe amount of work fluid as $\frac{1}{2}$ of the movement of surface 270. Other proportions are possible and depending on application will find usefulness. Four times the tube engaging surface area of surface 270 vs. surface 202 requires approximately $\frac{1}{4}$ of the relative movement to produce the same displacement. The word "approximate" is used because some variation is caused by the characteristics of tube means 44 when moved toward squeezed closed position and its conformity to surfaces 202 and 270 of the second and fourth tube squeezing means 106 and 110.

The compensator pin body 266 has an annular groove 272 and a transverse top end surface 274. A C-ring or split washer 276 is disposed in groove 272. Washer 270 retains compression spring 278 which engages it and boss 280 surrounding opening bore 100 in valve body 82. The non-compressed length of compression spring 278 is such that after assembly it exerts an outward bias on compensator pin body 266. In turn, through link members 222 and 214, an inward or shut off bias is exerted on shut off pin member 198 to bias the outlet closed. As best seen in FIG. 2, the pivot pins 188 and 230, for the first and second pivotal lever means 114 and 116 respectively, are spaced from the wall of the pump-/valve body 82 by spacers 282-284 (preferably teflon) which allow the first and second lever means to be aligned with each other. The lever means 114 and 116 are also aligned with tube means 44 and the first, second, third and fourth tube squeezing means 104, 106, 108 and 110 so that they may have coordinated relationship of movement.

Figure 25:
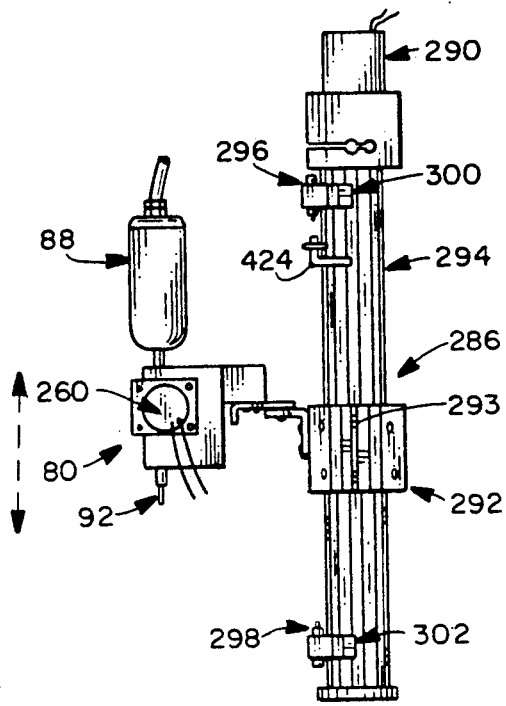
FIG. 25 is a side elevational view of an up-down tower some times referred to as a "Z" tower utilizing the valve/pump apparatus and concepts shown in FIGS. 1-19H.

Before describing the operation of apparatus 80, and in particular the sequential movements and coordinations depicted in FIGS. 19A through 19H, the control mechanisms and the movers for the apparatus 80 shall be described. As aforediscussed, the apparatus 80 is versatile and is useful in a variety of settings. In some nomenclature it may be referred to as an "end effector" for a dispenser in systems of different degrees of sophistication. These systems range from a simple hand held gun device to being associated with and mounted for movement in very sophisticated complex XYZ motions relative to work pieces which may be stationary and/or movable also. Due to construction, size, relatively low mass and programmability, the apparatus 80 is extremely useful for movement on the end of so called "Z" mechanism 286 (up down towers) as shown in FIG. 25. It is also very well adapted to be used in an XYZ mechanism 288 a shown in FIG. 26.

In the apparatus 286 of FIG. 25, the pump/valve 80 is movable in the up/down or vertical direction. This permits a work piece (not shown) to be moved (singly and manually or through automatic transfer means as called for by application needs) into a work station where the flowable work material can be delivered from dispensing needle tube outlet means 92. Up down operator means for movement of apparatus 80 is shown as a stepper motor means 290 similar to the stepper motor means 260 used in apparatus 0. It also may vary from a 50 steps per revolution type stepper motor to 50,000 micro steps per second depending on the precision required of the system application.

The stepper motor means 290 output is connectable to an internal screw of a ball screw (not shown in FIG. 25 but similar to those described with respect to FIG. 26) to cause precision bearing car block means 292 to ride on precision rail means 294. The car means 292 is attached to an internal ball traveler, not shown, (inside of the rail means) having external wings 293. The traveler is moved up and down by rotation of the precision ball screw which in turn is rotated in both directions by the stepper motor means 290 to cause up/down movement. Upper and lower limit switch means 296 and 298 may be employed to prevent overtravel. Also these switches may be employed to signal to the CPU means 262 attainment of position and trigger other events. For example car means 292 engaging and causing actuation of switch means 296 may be used to cause work piece means movers to index a new work piece into position for deposition. Engagement of car 292 causing actuation of switch means 298 may be used to cause a cycle of deposition of work fluid through apparatus 80. Depending on needs for high precision, a proximity switch 424, later described, may also be mounted on the rail means 294 for actuating the cycle. The switch means 296 and 298 are mounted on adjustable supports 300-302 which in turn are mounted on rail means 294 and which may be adjusted along the length thereof to give versatility to accomodate to different work piece or control requirements.

The stepper motor means 290 as a motion control for up down movement of apparatus 80 during dispensing to a work piece is advantageous where a complex movement profile in the Z axis is desired. By using the pulse stream and counting the predetermined number of pulses delivered to the stepper motor, the distance of travel movement can be provided. Different polarity provides movement in both directions. By appropriate software on a personal computer, the distance of travel, direction of travel and speed of travel of block 292 and pump/valve head 80 or end effector may be programmed as desired. The software for this coordination of movement of the up/down movement on the car means 292 on the Z tower with the actuation of the stepper motor 260 of apparatus 80 is obtainable from the 3M/OTTO Dispensing Division of Minnesota Mining and Manufacturing Co. in Carpentersville, Ill. Also available from the same company is the earlier discussed PATTERN, CONTROL and SYSTEM programs which may move a work piece holder platform in X/Y/Z directions relative to the Z tower 286. Alternatively or simultaneously the software may be used to program the XYZ movement of the apparatus 80 on the XYZ mechanism of FIG. 26.

The actuation of stepper motors 260 and 290 may be simultaneously coordinated. Where simple up/down movement is needed, then an air cylinder type movement (not shown) of block 292 is preferred—the block being attached to an internal piston actuatable from either side. When air cylinder(s) for up/down movement are used, the adjustable supports 300-302 with or without the switch means 296-298 may be used to control, by adjustment, the length of travel of the valve/pump apparatus 80 in an up down direction on the rail means 294. The proximity switch means 424 is not used in this simple type of Z tower apparatus. The switch means 298 however may be used to control initial actuation and cycling (to be described) of the apparatus 80.

Figure 26:
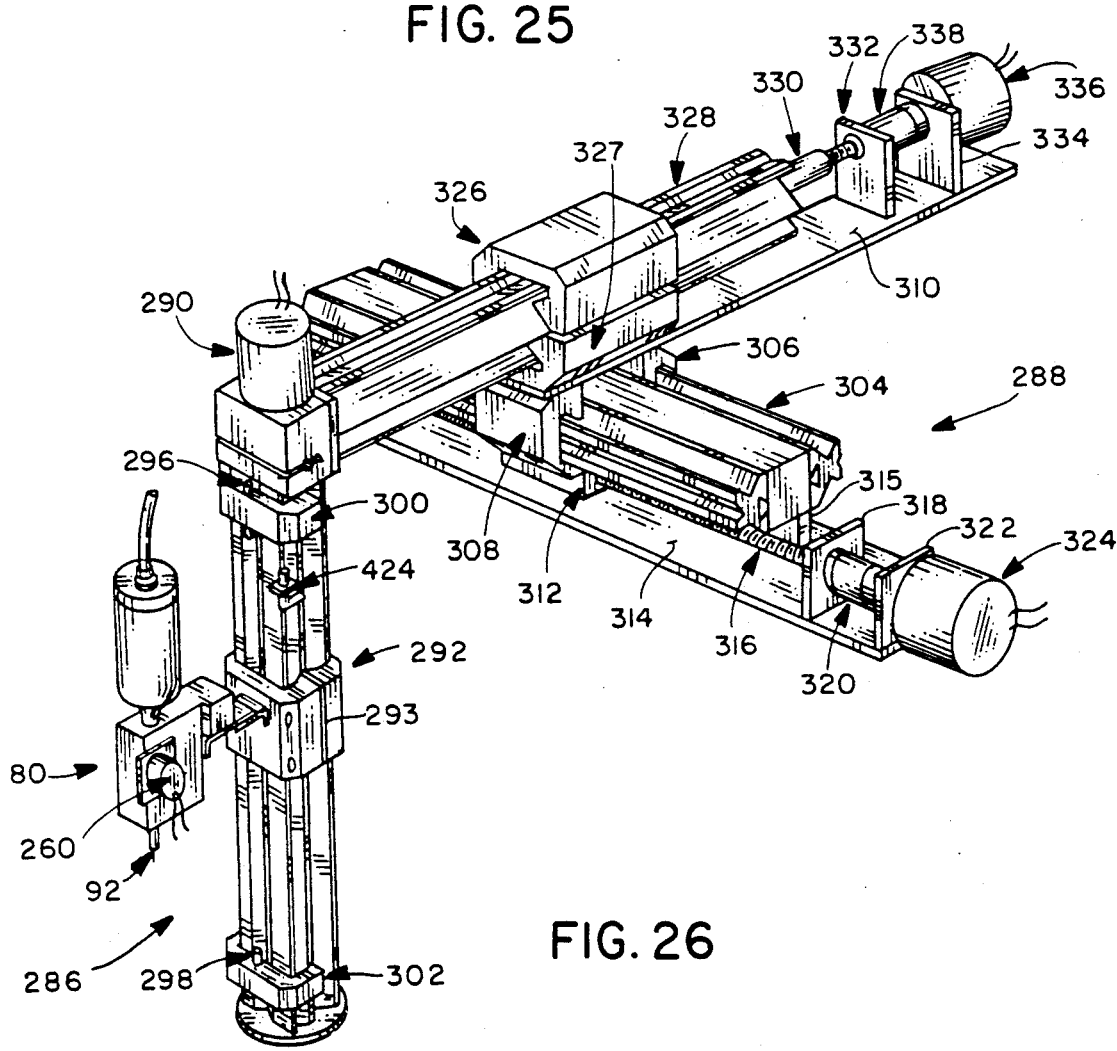
FIG. 26 is an isolated perspective view of an XYZ mechanism without the electrical/electronics incorporating the pump/valve of FIGS. 1-19H.

As shown in FIG. 26, the apparatus 80, when incorporated into an up down tower means 286, may further be a part of a sophisticated programmable XYZ mechanism 288. When in this type apparatus, all operations are controllable by the CPU 262 when programmed with the aforementioned software. In the apparatus 288, the X axis motion is provided by X axis rail means 304 which cooperates with movable X axis roller bearing block means 306 and 308 which are spaced apart and fixedly mounted to traveler block means 312. Traveler block means 312 is movable relative to base 314 and cooperates with precision screw means 316. The roller bearing block means 306-308 are fixed to Y axis plate means 310. Thus both the Y axis plate means 310 and the block means 306-308 are relatively movable as a unit to the X axis frame plate means 314. The roller bearing block means 306 and 308 are widely spaced for riding on the fixedly mounted spaced rail means 304 which is in turn fixedly mounted on plate means 314 by upstanding plate 315. The arrangement helps provide repeatable stable precision movement of apparatus 80.

One precision screw means 316 and traveler means 312 that have been found suitable are those sold as Model R-505 manufactured by a division of the Warner Electric Brake Company of South Beloit, Ill. The traveler means 312 is also sometimes referred to as a ball nut. Fixed plate means 314 has an upstanding bearing flange means 318 for mounting the precision screw means 316 which, through coupling means 320 and mounting means 322, is operatively connected to X axis precision stepper motor means 324. The X axis stepper motor means 324 is programmably driven under the control of CPU 262 through the circuitry shown in block diagrams from in FIG. 21 and 22 and in more detail in FIG. 23. The stepper motor means 324 is similar in characteristics to stepper motor means 260.

Y plate means 310 mounts thereon fixed roller bearing block means 326 and 327 for precision relative movement of the Y axis movable rail means 328. The Y axis rail means 328 is moved (unlike the X axis arrangement where the rail means is fixed) in roller block means 326 and 327 by precision screw means 330, there being bearing flange means 332 and stepper motor mounting flange means 334 for precision control of relative movement to roller blocks 326-327. A stepper motor means 336 (similar to aforediscussed stepper motor means 260) is coupled to screw means 330 by coupling means 338. It is convenient to have stepper motor means 336 also be programmable through CPU 262 and the precision screw means 330 is similar to precision screw means 316 (afore described). The precision screw means 330 cooperates with the ball nut or traveler of the ball screw means and on this Y axis it is internally fixed to the rail means and is not shown. As will be understood it serves the same purpose as screw block means 312 to afford precision movement under control of the programmable stepper motor means 336. Both the Y axis and Z axis rail means 328 and 294 are relatively smaller than the X axis rail means 304 and are lighter in mass. The heavier construction of the X axis is for dimensional and operational stability.

Figure 21:
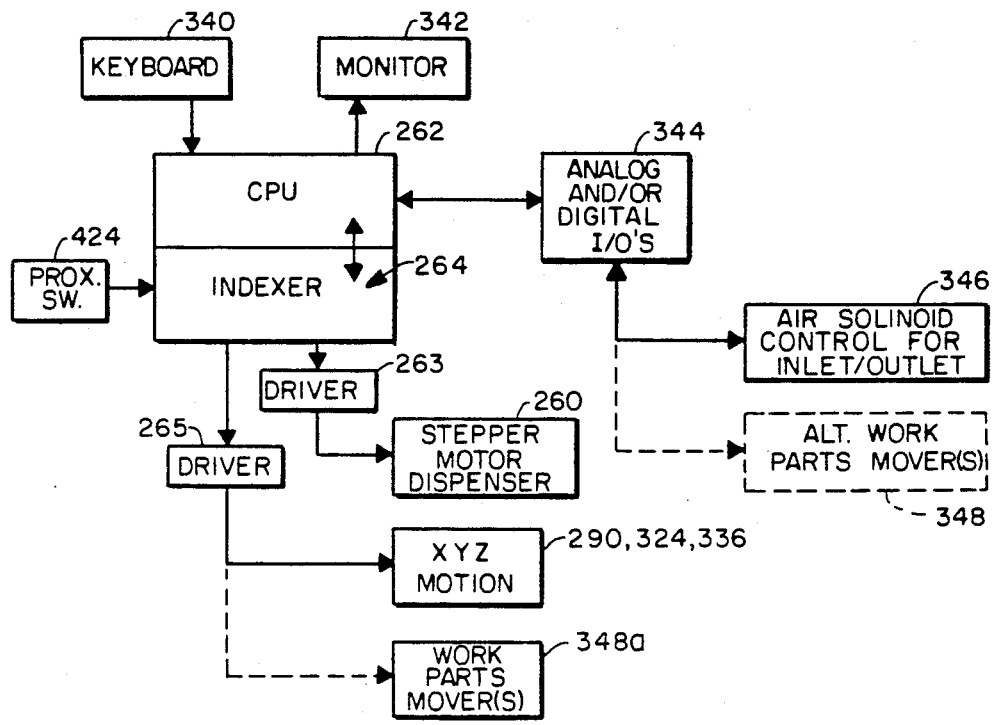
FIG. 21 is a semi-diagrammatic view, in block diagram form, of the motion control cooperative electrical/electronic parts with signal information flow (both unidirectional and bidirectional) being indicated by arrows, which coordinate and are cooperable with the aforegoing valve/pump dispenser shown in FIGS. 1-19H.

The block electrical/electronic functional and signal direction schematic for apparatus 286 is shown in FIG. 21 with alternate additional functions shown in dotted lines. More particularly the CPU 262 may be programmed by inputting use of a standard keyboard means 340 with aforementioned software compatible with the CPU. The inputs, as will be understood, are screen readable on the monitor means 342. The CPU means 262 has electronically and functionally associated therewith input/output board means (I/O boards) 344. These I/O board means 344 may be internally or externally mounted on the CPU, or in a stand alone or an internally mounted indexer means 264 or in stand alone relation but connected to the indexer means 264. The I/O boards, as will be well understood may receive various inputs and give situationally dependent outputs, receiving the inputs from various sensors in a system depending of system requirements.

The analog type I/O boards, available in the market, are useful for receiving ranges of sensory inputs such as proximity, temperature, pressure, flow and the like. Several of these sensory circuits and analog I/O boards being more particularly shown and described in the aforementioned copending application assigned to the same assignee entitled METHOD AND APPARATUS FOR PRECISION PUMPING, RATIOING AND DISPENSING OF WORK FLUIDS having Ser. No. 07/118,330 filed Nov. 6, 1987. The digital I/O boards are particularly adapted to on/off type for control sensing and signalling. In the semidiagramatic circuitry of FIG. 22 and the schematic of FIG. 23, the air solenoid 346 which controls flow of air to the operator cylinder means 112 of the valve/pump 80 is routed through a digital I/O board means.

Various alternate work part movers (not shown) may be controlled through the I/O boards 344 as shown by dash lines to block 348. For example, the work part mover may be controlled by on/off switches in an electric circuit. Alternatively, as shown in the aforementioned copending application, movers may be under the control of a stepper motor means through the indexer means 260 as shown by box 348a in dotted lines. A work part mover is shown in the aforementioned copending application.

The stepper motor means 260 associated with apparatus 80 to cause positive dispensing pumping and each of the stepper motor means 290, 336 and 324 for motion in XYZ planes, are controlled by signals to the indexer means 264 associated with the CPU. Depending upon degrees of simultaniety of movement required, additional separate indexers may be needed. The XYZ motion is shown by diagram box 352 and will be explicated in connection with the electrical/electronic circuitry in FIG. 23.

Figure 22:
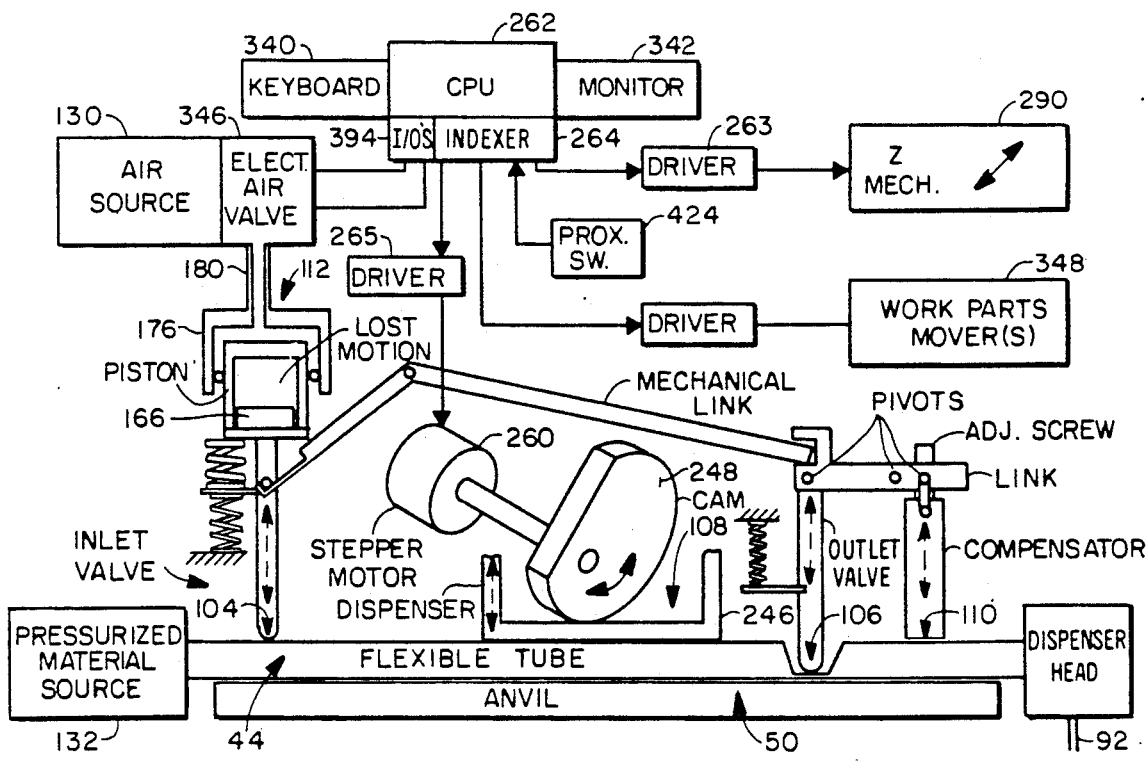
FIG. 22 is a semi-diagrammatic view of the apparatus utilizing the electrical/electronics of FIG. 21 for the control of movement of the valve/pump apparatus shown in FIGS. 1-19H.

In FIG. 22, the apparatus 80 is shown in a mechanically pictoral form when it is integrated into an apparatus with a stepper motor controlled parts mover and an XYZ apparatus as shown in FIG. 26. When the apparatus 80 is used "stand alone", then boxes 348, 348a, their driver cards and and the functions represented are not used. When a "Z" or up/down tower is used, then only the boxes for circuitry for a Z stepper motor 290 plus the dispensing stepper motor 260 is required as shall be discussed.

As shown in FIG. 22 and FIG. 24 the air from the air source 130 to inlet 180 of cylinder 176 of operator means 112 may be controlled by CPU 262 through connections to I/O board means 344. The CPU 262 programmably actuates a suitable air solenoid means 346, (see FIGS. 23 and 24) which allows air to flow to the cylinder 176 moving piston 170 and causing movement of first tube squeezing means 104, second tube squeezing means 106 and fourth tube squeezing means 110 relative to anvil means 50. Through indexer means 264, stepper motor means 260 is rotated in programmably controllable steps (from 50 to 50,000 per revolution) to rotate cam member 248 to cause the fourth tube squeezing means 108 to precisely and positively dispense fluid in tube means 44 through needle 92.

The air schematic of FIG. 24 shows pressurized air in the system preferably being routed from source 130 by suitable air lines 356 through a dryer 352 and filter 354 to a branch air line 358 into reservoir 133 for the work fluid cartridge via air nipple inlet means 124. The air inlet means 124 to the cartridge is shown diagrammatically in the schematic as bulk head 1 (BH1) and the inlet 180 to the air cylinder 176 is shown as bulk head 2 (BH2). A suitable pressure regulator and gauge means 360 is employed in branch line 358 for normal functions. Branch air line 362 also has a suitable pressure regulator and gauge 360 and the air pressure to the operator means 112 (air cylinder 176) through air inlet 180 is controlled by air solenoid 346 which as aforementioned is controlled by the CPU 262.

FIGS. 23-1, 23-2, 23A and 23B show an electrical schematic, in ladder form, of the electrical and electronic controls for operating the Z tower shown in FIG. 25. By replication of certain components the circuitry for the XYZ of FIG. 26 is produced. By elimination of certain components, the circuitry for the apparatus 80 when operated as a stand alone is produced. This will be further described.

Power from source 364 is controlled by main on/off switch 366. One leg of the circuit goes to ground 368, the operating legs one 370 and two, 372 being as shown and preferably having 110 V/60 cycle characteristics.

The various electrical/electronic components for apparatus of the type described, by standard practice, are located in an electrical box (not shown) for user protection and for other obvious reasons. It is also standard practice to cool such a box by a small motor driven fan 376. There is shown a main power control relay 378 which powers all components when switch 374 is closed. As will be observed fuse means 380 is employed to protect circuit components.

First transformer means 382 is connected across the 110 V legs 370-372 on one side and is stepped down and rectified into both 5 volt DC output 385 and 24 volt DC output 386. As shown, the 5 VDC output take offs are represented by circuit lines 388 and 392. The line 388 is the positive outtake and line 392 is common and is the negative outtake. The 24 VDC portion 386 has line 390 as the positive outtake, and also uses common 392 for the negative outtake line. This transformer circuit is separately fused at 394 in accordance with good practice.

Figures 1, 23:
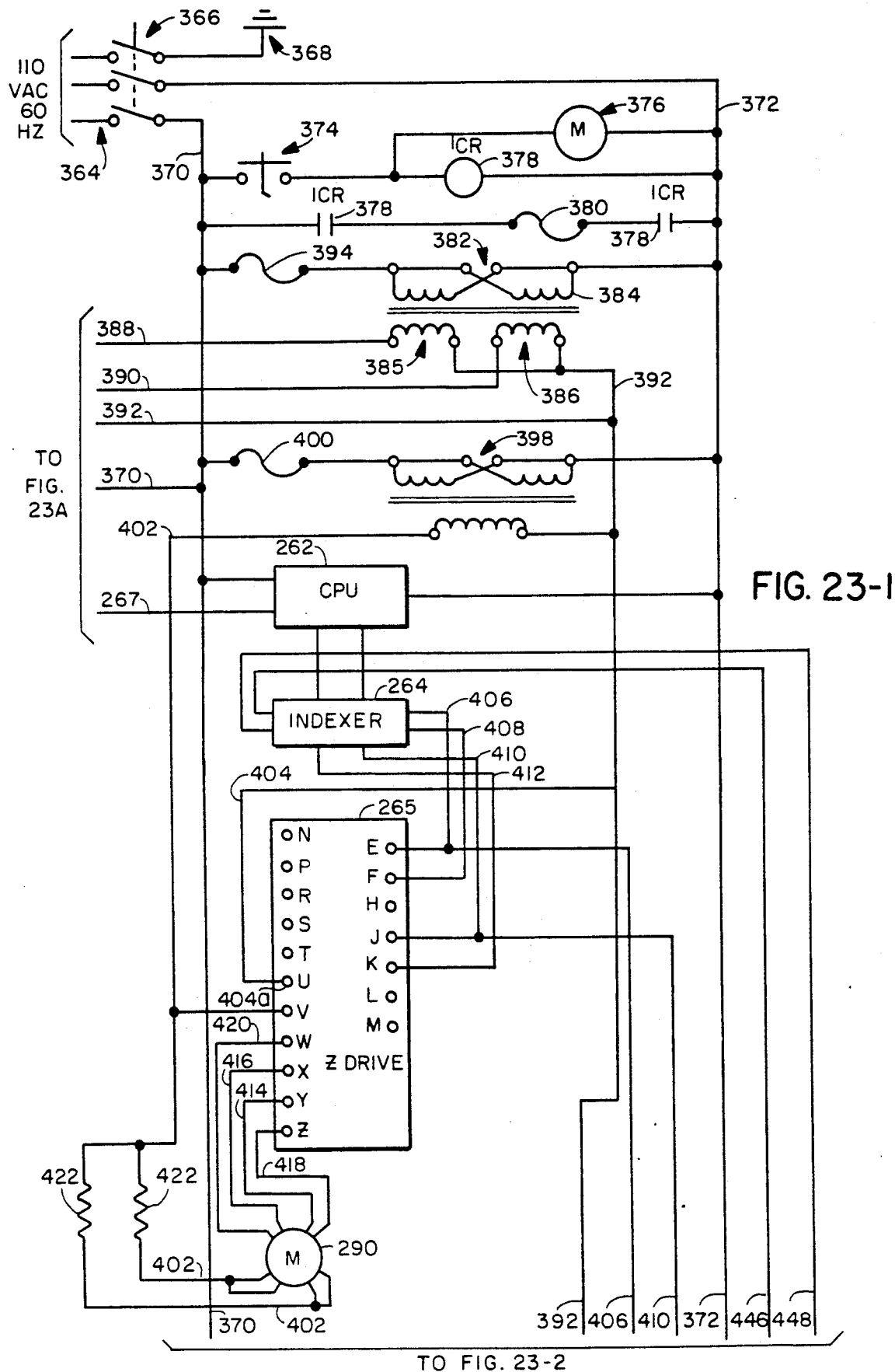
FIG. 23 comprising FIG. 23-1 and its continuation FIG. 23-2 and the circuitry in FIGS. 23A and 23B are an electrical schematic view of the base electrical connections and components used to operate the apparatus shown in FIG. 25 with certain additional components and circuitry being a replication of those shown when used in an apparatus of the type shown in FIG. 26.
Figures 2, 23:
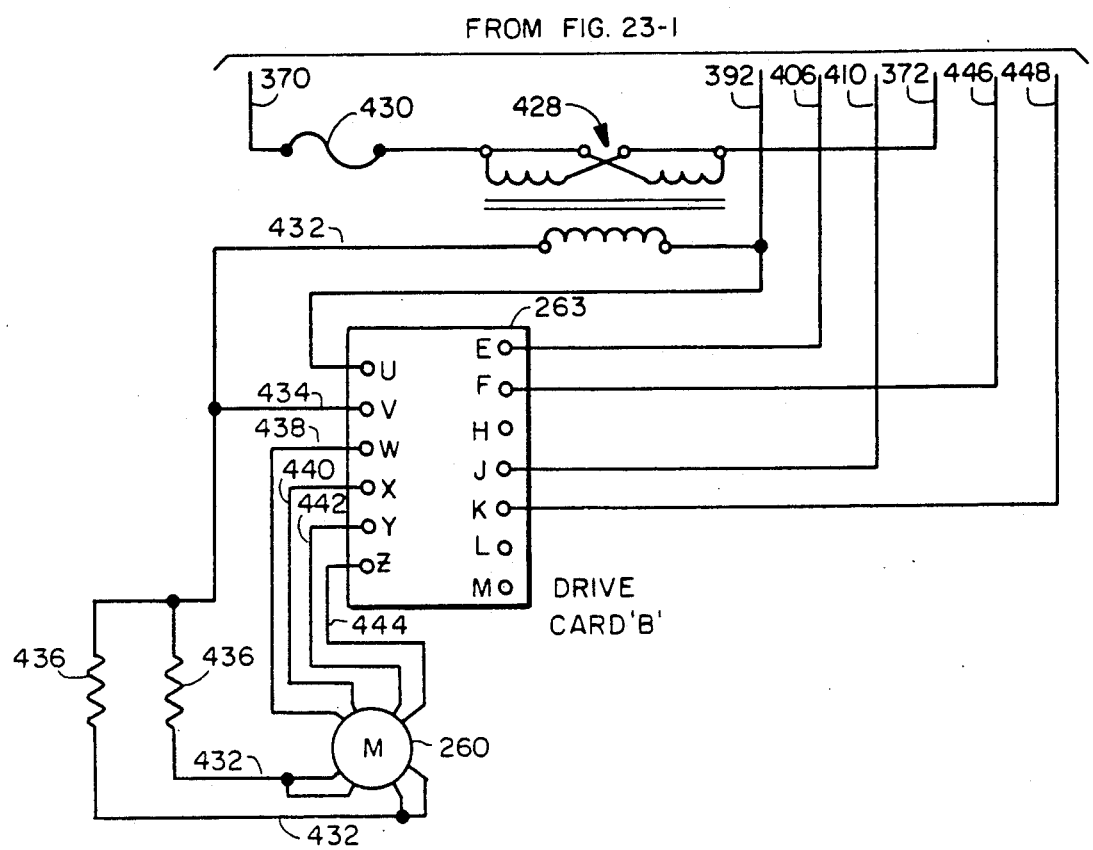
Figure 23A:
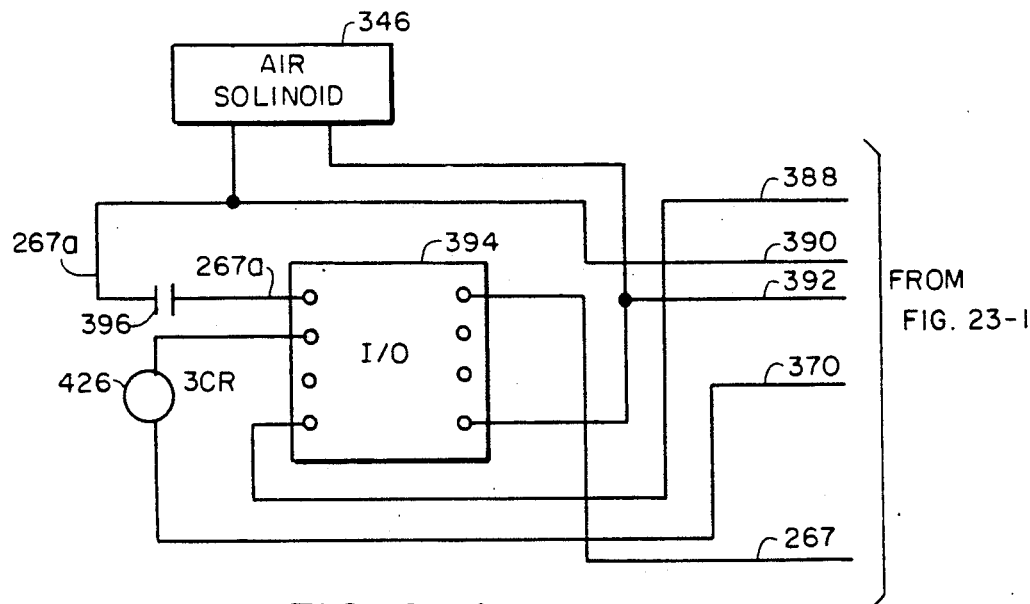

Circuit line 388 (5 VDC) together with common 392 powers I/O board 394 (shown diagrammatically in FIG. 23A). As shown semidiagrammatically in FIG. 23-1, the CPU 262 is powered by legs 370 and 372 of the 110 volt circuit. The I/O board 394 receives signals from the CPU 262 through signal line 267 which commands the air solenoid 346 through line 267a and control relay 396, to be energized in the 24 volt circuit through lines 390, 392 from the 24 VDC portion 386 of the transformer 382. It will be appreciated that the signal coming from the CPU 262 trips relay 396 and the air solenoid 346 will become energized. A different signal from CPU 262 will cause the air solenoid to be put into in a non-trip position as determined by the sequencing as programmed into the CPU via the software aforedescribed.

The 24 VDC output 286 from the transformer 332 through legs 390 -392 may also be used (either directly or through powering a portion of an I/O board not shown) to energize other sensors/components/signal lights/motors etc depending on system needs and requirements. When power requirements so demand, additional 24 volt transformers may be employed in the system. A number of different components, sensors, and motor means powered in 24 volt circuits are shown in the electrical schematics of the copending application aforementioned. They are incorporated herein by reference.

A second transformer means 398 in this system is shown in FIG. 23-1 and transforms and rectifies the 110 volt 60 cycle current to 24 VDC with output lines 402 and common 392. The circuit is fused in conventional fashion and as is shown with reference numeral 400. Line 402 of the output of 2-4 VDC circuit powers both the stepper motor 290 (the Z axis mover) for moving car 292 and also powers the Z axis driver as shown semidiagrammatically as driver card 265. The driver card 265 is energized by power from 24 VDC line 392 through circuit line 404 into junction 404a on the card 255 so that the step and direction signals from the CPU 262/+indexer 254, both pulses and polarity, are routed as necessary and desired in the system through indexer circuit lines 406, 408, 410 and 412.

When driver card 265 is powered, pulses from input lines 406, 408, 410 and 412 receivable from the indexer 264 are then operable, for example, to energize the 4 stepper motor segments of stepper motor 290 (the Z tower stepper motor) from the power provided from input power of line 402 of the second transformer 398 24 VDC output. As shown, power to motor 290 is completed to the driver 265 through appropriate motor segment connection lines 414, 416, 418 and 420. Suitable resistors 422 are in the motor circuit, there being one resistor for each pair of segments of the stepper motor.

The polarity of the signals received through signal lines 406, 408, 410 and 412 from the indexer 264 associated with the CPU 262 determines the direction of rotation of the motor 290. This in turn controls the direction of rotation of the precision screw (not shown) for movement of movable car 292 which carries apparatus 80 thereon in either the up or down direction. The car 292 is movable from the known home position, preferably determined by the relative position of the car 292 to the home proximity switch means 424. The proximity switch circuitry is shown semidiagrammatically in FIGS. 21 and 22 and is associated with the indexer 264 so that movement, both up and down direction and length or distance of travel from the reference point is known and is programmable. One proximity switch 424 found suitable for this usage in a 24 VDC circuit, is manufactured by OMRON TATEISI ELECTRONICS COMPANY which has sales outlets throughout the U.S. Various models and sensitivities are available for various degrees of precision. Preferably the proximity switch means 424 may be adjustably mounted on the rail means whereby the home or 0 position may be adjusted to meet various work piece and system needs.

The pulses received from the indexer 264 at the driver card 26 power the 4 segments of the motor 290 in sequence for a predetermined number of power pulses. Each pulse received, when energizing a segment, causes a partial rotation of the armature and is denominated a step. The exact number of steps is based upon the programmed number of pulses received at driver 265 as commanded by the CPU 262 through the indexer 264. The pulses to the motor 290 (or steps) cease upon reaching the programmed stopping point. The exact amount of rotation is thus determined by the number of pulses that drive the stepper motor and it will be appreciated this is translated into linear length of movement of the precision screw means (not shown) internally of the Z tower. Hence linear movement of the car means 293 in an up down direction from the home position is precisely, repeatably and reliably controlled.

The circuit includes a 3rd step down transformer means 428 which is fused at 430 between lines 370 and 372. The 3rd transformer means 428 provides 24 VDC power through output lines 432 and common 392. The number of 24 VDC lines needed in a system depends upon the amount of amperage used up by the various components, motors, etc. and good electrical system design practice. It is found convenient to separately transformed 24 VDC circuits to keep the amperage relatively low so that user safety is maintained and for using relatively lighweight electrical lines in the circuit.

The 3rd transformer means 428 (see FIG. 23-2) through output line 432, powers stepper motor means 260 for the valve/pump apparatus 80. Line 432 powers driver card 263 at junction 434 and also branches off and powers the 4 segments of stepper motor 260 as shown. Motor resistors 436 are provided as well understood for each pair of the 4 segments of the stepper motor 260. Circuit lines 438, 440, 442 and 444 are connected to junctions on the driver card 263 so that pulses received at the card will be directed to the separate segments similarly to those received at stepper motor means 290 aforedescribed.

Figure 23B:
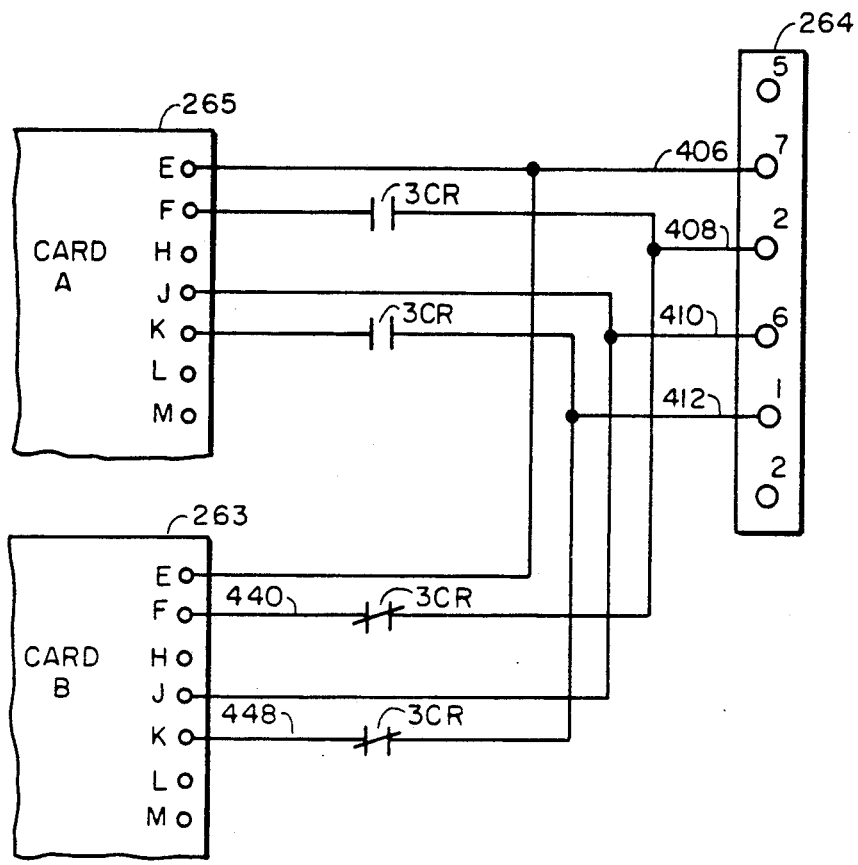

Driver card means 263 has 2 circuit lines from the indexer 264 in common with driver card means 265. More particularly as shown in FIG. 23B, lines 406 and 410 are preferably common to both of the cards 263 and 265 so that multiplexing will take place as will be later described. However separate lines 446 and 448 to receive pulses from the indexer 264 are provided for driver card 263.

A suitable control relay 426 is provided and is operable to switch the pulse polarity with respect to signals from the indexer 264. See FIG. 23A.

In essence the multiplexing or multitasking comes about through the use of 6 lines vs. 8 lines in the circuitry to the two drive cards. It is a cost saving approach for Z tower use for dispensing, and occurs only when the system usage is such that there is no dispensing when the head is moved to or away from dispensing position. In this arrangement, Z tower up down movement must be completed before power is sent to dispensing stepper motor 260. When concurrent movement in the up down direction and dispensing movement to stepper motor 260 is required, then separate concurrent signals must be sent to the motors from the indexer means 264 rather than through a sequentiality which is provided by the control relay 426. It is preferable that a completely separate indexer card, similar to indexer 264 be used when simultaneous action is required to feed the pulses to the respective drivers for the respective stepper motors.

System sophistication is a variable depending upon user needs. It is a combination of hardware capabilities and cost, software capabilities and cost, and tolerances of movers available for required precision and their cost. A relatively simple and inexpensive stepper motor driver means 263/265 will give 100 steps per revolution. As previously discussed more sophisticated drivers with micro stepping are commercially available and will give 50,000 steps per revolution. However having 50,000 steps per revolution does not help system precision if the tolerances in the translation means of the steps of stepper motor rotation have a tolerance greater than the step subdivision movement precision.

The X and Y axis movements of the XYZ mechanism of FIG. 26 through the respective stepper motors 324-326 associated with each of these axes may be powered through circuitry and components similar to that shown for powering stepper motor 290. The circuitry being a replication of that described has not been shown for purposes of simplicity in the instant application. In other words, the circuitry for the X axis movement is a replication of the circuitry for the Z axis movement.

The rotary stepped movement of the stepper motor can be translated into linear movement by any of several types of translation means. For example in addition to the cam means 248 shown in connection with stepper motor 260 of the valve/pump means 80, and the precision ball screw means 312, 316 and 330 shown with the XYZ mechanisms and Z towers aforedescribed, other rotary to linear translation means are available.

In addition to various stepper motors that may be used in the system depending the needs, requirements and sophistication of the system, the indexer means and driver means are of varying sophistication. Details as to some that have found suitable in a sophisticated application are explicated in detail in the aforementioned copending application. Suffice it to say that depending upon the degree of sophistication desired, and the budgeted cost for the system, extreme precision of dispensing coordinated with movement of the work material through the dispensing head in any of the 3 axes XYZ concurrently or sequentially, is available using the instant apparatus and circuitry.

Irrespective of whether the apparatus 80 is used in an XYZ apparatus, an up down Z tower, or as a stand alone end effector, or a tube pump/valve apparatus in a fixed location, the apparatus 80 has some sophisticated attributes in its operational sequence now to be described.

Attention is particularly invited to FIGS. 19A through 19H and the semidiagrammatic FIG. 22. In this regard it will also be observed that FIG. 4A shows the position of the parts and corresponds to the fill portion cycle of 19A; FIG. 4B corresponds to FIG. 19B; FIG. 4C corresponds to FIG. 19D; and FIG. 4D corresponds to FIG. 19H.

For ease of discussion, the semidiagrammatic FIGS. 19A through 19H in conjunction with FIG. 22 shall be used. In operation the fill cycle starts with the position of the parts and components as shown in FIG. 19A. It will be observed that a reference point R is shown in all of the FIGS. 19A through 19H and the distance of movements of the piston 156 (and all other parts moving in the horizontal page plane) shown is relative to that reference point. E.g. see FIGS. 19B, 19C, etc. Reference numerals are not put on all of the FIGS. 19A through 19H—to avoid clutter.

In the FIG. 19A fill cycle, work fluid under pressure from the source 130 enters the tube means 44, since the first tube squeezing means 104 is located in its nontube engaging position (as also shown in FIGS. 3 and 4A). Operator means 112 has no pressure in the chamber counteracting the influence of biasing springs 158 and 16 which cause the piston 166 to move to its furthest outwardly (to the right) position. Spring 278 is biasing the fourth tube squeezing means 110 (compensator) away from engagement with the tube means and through link means 116 biases the second tube squeezing means 106 (outlet valve) into tube squeezing closed position. It will be observed that pivotal link means 114 is in neutral or floating position and the third tube squeezing means 108 dispenser means is located so as to be not squeezing the tube means 44. With the parts shown in the positions of FIG. 19A, it will be observed that the tube means 44 will fill with work fluid down to the constriction provided by the second tube squeezing means 106 (outlet valve).

Air pressure from source 130 through air line 356 (FIG. 24, air schematic) enters into the cartridge reservoir 133 forcing the material out of the cartridge 132 into tube means 44. It will be noted that the apparatus 80 is fail safe in the sense that the outlet or second tube squeezing means 106 is separately biased to a shut off position and can only move to an open position when the first tube squeezing means 104 (inlet) is closed after compression of the biasing springs 158 and 160.

With the tube means 44 filled with work fluid, piston 166 is advanced relative to reference point R by actuation of the air solenoid 346 which as shown in FIG. 22, is controlled by programming of CPU 262 and its signals via I/O board 394 (see FIG. 23A). As the piston 166 moves to the left as shown in FIG. 4B and 19B, weaker spring 158 is compressed but relatively stronger spring 160 does not compress. Thus the end 102 of the 1st tube squeezing means 104 does move and close off the tube means. Since spring 158 must bottom out before compression of spring 160 occurs, there is no movement of the head 164 of body 142 relative to the piston 166. As the piston 166 advances, it finally causes compression of spring 160. The piston movement also causes end surface 169 engagement of the pivotal link 114 to in turn activate link 116 against the bias of spring 278. As shown, the arrangement of the parts is such that the first tube squeezing means 104 totally squeezes the side walls of the tube shut before the second tube squeezing means 106 can be opened.

As shown in FIG. 19C, in preparation to dispense, the movement of the piston 166 and the lost motion connection 182 causes link 114 to engage and move the second tube squeezing means 106 through link means 116 to cause the second tube squeezing means to move to its non-squeezing position. Also, second pivotal link means 116 simultaneously causes the compensator means 110 to move to the left to a partially tube squeezing position.

As shown in FIG. 14D, dispensing may now be programmed by the CPU to occur. Rotation of the cam 248 against the U-shaped dispensing member 238 causes tube squeezing displacement dispensing. As can be seen in FIG. 22 the stepper motor means 267 for driving cam 248 receives signals from the driver card 265 which in turn are received from the indexer 264. Cam 248 is then rotated so as to cause the U-shaped member 238 to compress the tube means 44 against the anvil means 50 to positively displace the work material within the tube means. Since the pulse stream to the stepper motor 260 may be programmably controlled, the amount of rotation of the cam and the direction of the cam movement is under the control of the CPU 262 as inputted by the user through the keyboard 340 using the aforenoted software. The U-shaped member 238 may be advanced to complete tube squeezing position or stopped at any intermediary position as operator selected. When the U-shaped member 238 is programmed to be moved by the cam 248 and moves to full dispense position, the work fluid is dispensed through squeezing of the tube to its ultimate extent as shown in FIG. 19D. It will be noted that the work material is moved out the outlet end of the tube means 44 through the dispensing needle 92 because tube squeezing member 104 prevents upstream movement of the work material.

It is at this point in the sequence that the concept of suckback comes into play, an important concept in repeatable precision dispensing. Because of the programmability of the stepper motor 260 through the mechanisms and circuitry aforedescribed, the U-shaped member 238 which forms a part of the 3rd tube squeezing means is moved slightly away (to the right as viewed in the drawings) from its full dispense position thereby causing a partial vacuum in the tube means. This in turn causes material to be sucked back slightly from the dispensing needle and drip between cycles is thus prevented. Very slight reverse movement is generally all that is required depending upon the nature of the work material and the various perameters of dimensional tolerance and material characteristics.

As shown in FIG. 19E, during dispense suckback the parts are still essentially in the position as the dispense position of FIG. 19D excepting the reversed slight rotation of the cam 248. The major suckback of the cycle is preferably provided by the dispensing means. As aforediscussed, additional suckback may be provided by the compensator or 4th tube squeezing means 110 as shown in FIG. 19G and as shall be described.

As the cam means 248 continues its reverse direction rotational movement as shown in FIG. 19F, operator means 112 allows the piston 166 to move to the right as shown in FIG. 19F under the bias of springs 158, 160 and 278. Also it will be appreciated that solenoid 346 has received a signal in the circuitry descrised so that air from cylinder 176 is allowed to escape so that the bias of the springs now become operative as the dominant force on the piston 166. The first tube squeezing means 104 inlet still remains in its closed position until after the outlet is closed. Because of the balance in the system created by the compensator/outlet simultaneous action, the slight vacuum suckback by the third tube squeezing means is not disturbed by the closing of the second tube squeezing means 106.

As shown in FIG. 19G, full tube squeezing shut off by the second shut off means 106 occurs when the piston means 166 has moved to a position so that the first pivotal link means 114 no longer is compressing spring means 278. However, it will be noted that there is still slight tube squeezing engagement of the compensator means 110 with the tube means 44 in the portion of the cycle as shown in FIG. 19F. It has been found that having the fourth tube squeezing means or compensator 110 move a slight distance outwardly after initial shut off by the outlet valve means 106 will afford fine tuning suckback characteristics.

More particularly, when moving the second tube squeezing means 106 to a further compressive position against the tube so as to overtravel slightly beyond that point of movement causing shut off, the simultaneous movement of the compensator or fourth tube squeezing means 110 can cause additional fine tune suckback. By adjusting the adjustment screw 236, fine tuning of the system can occur without invading the basic software program and the use of dispenser member 238 for primary suckback. This affords easy operator adjustment to the system to take care of minute variances that may occur from apparatus to apparatus or for slight variances in dispensing conditions/work materials or the like. However in those systems where there is no stepper motor 260 (or suitable alternative means for providing a complex movement profile to the dispensing member) it will be appreciated that all suckback can occur with the compensator.

As shown in FIG. 19H, after the compensation suckback has occurred, the outlet valve means 106 is in the shut off position prior to fill. The parts have now returned to the position where fill cycle can commence and movement to the position shown in FIG. 19A next occurs. It will be seen that continuous cycling will provide a pump action.

It will be appreciated that the the coordination of the stepper motor 260 with Z axis stepper movements of the stepper motor 290 is readily accomplished. Additional XY motion with stepper motors 324 and 326 in sequential and/or concurrent movements has also been disclosed. It will be equally appreciated that the dispensing head 92 may be moved in an XYZ planes relative to work parts and that the work parts themselves may be moved in XYZ planes. Further, that there has been described highly sophisticated circuits and apparatus for high precision dispensing using all of the advantages of an easily replaceable squeezable tube in a pumping usage.

The various combinations of precision programmable pumping and dispensing head movement and work piece movement with or without additional peripheral apparatus has been shown and described. Various changes and modifications in the illustrated embodiments of the invention will suggest themselves to those skilled in the art and can be made without departing from the spirit of the invention. All such changes and alternatives are contemplated as may come within the scope of the appended claims.

I claim:

1. The method of precision positive shut off of a flowable work material from a source operable to cause the flowable work material to move through a dispensing outlet and having a flexible tube means intermediate the dispensing outlet and the source, said flexible tube means having an inlet end, an outlet end, an outlet movable surface and a compensator movable surface, each of said outlet movable surface and said compensator movable surface being operable for pinchingly engaging and disengaging said flexible tube means between the inlet end and outlet end, said compensator movable surface being larger than said outlet movable surface comprising the steps of:

a) with said compensator movable surface being in a partial pinching position, moving the outlet movable surface from a flow permitting position to a complete tube pinching position to prevent flow of material from said source and to prevent egress of work material in said tube means out said outlet end, b) substantially simultaneous with step (a), moving said compensator movable surface in a direction opposite to the movement of outlet movable surface and a distance proportional to the relative sizes of said outlet movable surface and said compensator movable surface, and c) moving said outlet movable surface from said complete tube pinching to prevent flow position to said flow permitting position while substantially simultaneously moving the compensator movable surface to its original partial tube pinching position whereby the volume of flowable work material in said tube means displacingly moved by outlet movable surface is offset by the tube internal volume change caused by movement of the compensator movable surface thereby preventing surge or suckback of work material through said outlet end when said outlet movable surface moves toward its pinching off of flow position or flow permitting position without ballooning of the tube means.

2. The method of claim 1 wherein during step (a) the compensator movable surface moves from its partial pinching position to a lesser tube pinching position.

3. The method set forth in claim 2 wherein said compensator movable surface is further moved away from a lesser tube pinching engagement with said tube means subsequent to movement of the outlet movable surface completing a flow preventing pinching action to provide a back pressure suckback of work material.

* * * * *

UNITED STATES PATENT AND TRADEMARK OFFICE
CERTIFICATE OF CORRECTION

PATENT NO. : 5,035,350

DATED : July 30, 1991

INVENTOR(S) : Russell E. Blette and John O. Roeser

It is certified that error appears in the above-identified patent and that said Letters Patent is hereby corrected as shown below:

Col. 5, line 13, "slots" should be -- shots --.

Col. 6, line 6, first instance of "of" should be -- on --.

Col. 6, line 16, "3,932,055" should be -- 3,932,065 --.

Col. 9, line 54, delete "60".

Col. 11, line 7, "44" should be -- 46 --.

Col. 12, line 20, "32" should be -- 82 --.

Col. 12, line 52, "87" should be -- 80 --.

Col. 13, line 31, "followar" should be -- follower --.

Col. 13, line 52, insert -- in -- after "slide".

Col. 13, line 63, "uppe" should be -- upper --.

Col. 14, line 14, "152" should be -- 162 --.

Col. 14, line 35, "mean" should be -- means --.

Col. 14, line 37, "18B" should be -- 188 --.

Col. 15, line 48, "253" should be -- 250 --.

Col. 15, line 60, "safe" should be -- same --.

UNITED STATES PATENT AND TRADEMARK OFFICE
CERTIFICATE OF CORRECTION

PATENT NO. : 5,035,350

DATED : July 30, 1991

INVENTOR(S) : Russell E. Blette and John O. Roeser

It is certified that error appears in the above-identified patent and that said Letters Patent is hereby corrected as shown below:

Col. 16, line 40, "a" should be -- as --.

Col. 16, line 50, "0" should be -- 80 --.

Col. 18, line 62, "of" should be -- on --.

Col. 20, line 68, "2-4" should be -- 24 --.

Col. 23, line 50, "16" should be -- 160 --.

Col. 24, line 37, "267" should be -- 260 --.

Col. 25, line 19, "descrised" should be -- described --.

Signed and Sealed this

Twenty-fourth Day of August, 1993

Attest:

BRUCE LEHMAN

*Attesting Officer*  *Commissioner of Patents and Trademarks*